US011972078B2

(12) United States Patent
Kremin et al.

(10) Patent No.: US 11,972,078 B2
(45) Date of Patent: Apr. 30, 2024

(54) HOVER SENSING WITH MULTI-PHASE SELF-CAPACITANCE METHOD

(71) Applicant: Cypress Semiconductor Corporation, San Jose, CA (US)

(72) Inventors: Viktor Kremin, Lviv (UA); Volodymyr Bihday, Lviv (UA); Ruslan Omelchuk, Lviv (UA); Oleksandr Pirogov, Lviv (UA); Vasyl Mandziy, Lviv (UA); Roman Ogirko, Lviv (UA); Ihor Musijchuk, Lviv (UA); Andriy Maharyta, Lviv (UA); Igor Kolych, Lviv (UA); Igor Kravets, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/016,194

(22) Filed: Jun. 22, 2018

(65) Prior Publication Data

US 2019/0179446 A1    Jun. 13, 2019

Related U.S. Application Data

(60) Provisional application No. 62/598,347, filed on Dec. 13, 2017.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/04166* (2019.05); *G06F 3/0446* (2019.05); *G06F 2203/04108* (2013.01)

(58) Field of Classification Search
CPC .... G06F 3/044; G06F 3/0416; G06F 3/04166; G06F 3/0446; G06F 2203/04108
See application file for complete search history.

(56) References Cited

U.S. PATENT DOCUMENTS 8,860,682 B1 * 10/2014 Kremin ............... G06F 3/04166
                                                   345/173
9,110,543 B1 *  8/2015 Dabell ............... G06F 3/03545
(Continued)

FOREIGN PATENT DOCUMENTS

CN        1039301 A    1/1990
CN      102483673 A    5/2012
(Continued)

OTHER PUBLICATIONS

"Cypress Introduces the Industry's Most Advanced Automotive Touchscreen Controller" Cypress.com, Jan. 9, 2018; 1 page.
(Continued)

*Primary Examiner* — Jose R Soto Lopez

(57) ABSTRACT

A capacitance sensing device includes a transmit (TX) generator for generating a sequence of receive (RX) signals by applying each TX signal pattern in a sequence of TX signal patterns to a set of sensor electrodes. For each TX signal pattern in the sequence of TX signal patterns, and for each subset of three or more contiguous sensor electrodes of the set of sensor electrodes, the TX generator applies to the subset one of a first excitation signal and a second excitation signal. The plurality of subsets includes at least half of the sensor electrodes in the set of sensor electrodes. The capacitance sensing device also includes a sequencer circuit coupled with the TX generator. For each TX signal pattern in the sequence of TX signal patterns, the sequencer circuit determines a next subsequent TX signal pattern in the sequence based on a circular rotation of the TX signal pattern. The capacitance sensing device also includes a processing block coupled with the TX generator. The processing block detects a presence of an object proximate to the set of sensor electrodes based on a measure of correlation
(Continued)

between the sequence of RX signals and a predetermined function.

22 Claims, 25 Drawing Sheets

(56) References Cited

U.S. PATENT DOCUMENTS

| | | | | |
|---|---|---|---|---|
| 9,285,902 | B1* | 3/2016 | Kremin | G06F 3/041 |
| 9,323,398 | B2 | 4/2016 | Bernstein et al. | |
| 9,377,493 | B2 | 6/2016 | Hogan et al. | |
| 9,507,460 | B2 | 11/2016 | Lee et al. | |
| 9,600,707 | B1* | 3/2017 | Ramberg | G06F 3/045 |
| 9,778,301 | B2 | 10/2017 | Maharyta et al. | |
| 9,805,690 | B2* | 10/2017 | Kang | G06F 3/0446 |
| 9,851,829 | B2 | 12/2017 | King et al. | |
| 10,042,446 | B2* | 8/2018 | Yoon | G06F 3/046 |
| 10,310,683 | B2* | 6/2019 | Hu | G06F 3/04166 |
| 2007/0067463 | A1* | 3/2007 | Ishibashi | G06K 7/10326 709/227 |
| 2008/0253654 | A1* | 10/2008 | Delong | G06T 7/11 382/173 |
| 2009/0033343 | A1 | 2/2009 | Reynolds et al. | |
| 2009/0127005 | A1* | 5/2009 | Zachut | G06F 3/0446 178/18.03 |
| 2011/0148435 | A1* | 6/2011 | Schwartz | G01R 27/2605 324/658 |
| 2012/0013564 | A1* | 1/2012 | Westhues | G06F 3/0446 345/174 |
| 2012/0013565 | A1* | 1/2012 | Westhues | G06F 3/0446 345/174 |
| 2012/0056841 | A1* | 3/2012 | Krenik | G06F 3/044 345/174 |
| 2012/0253742 | A1* | 10/2012 | Sahinoglu | G01R 25/00 702/179 |
| 2012/0268416 | A1* | 10/2012 | Pirogov | G06F 3/04166 345/174 |
| 2013/0257804 | A1* | 10/2013 | Vu | G06F 3/04162 345/174 |
| 2013/0335252 | A1* | 12/2013 | Roberson | G06F 3/04166 341/173 |
| 2013/0339418 | A1* | 12/2013 | Nikitin | H03H 21/0001 708/819 |
| 2014/0022185 | A1* | 1/2014 | Ribeiro | G06F 3/017 345/173 |
| 2014/0104236 | A1* | 4/2014 | Hamaguchi | G06F 3/0416 345/174 |
| 2014/0320451 | A1* | 10/2014 | Lee | G06F 3/04166 345/174 |
| 2014/0340351 | A1* | 11/2014 | Forlines | G06F 3/0416 345/174 |
| 2015/0035787 | A1* | 2/2015 | Shahparnia | G06F 3/0446 345/174 |
| 2015/0130731 | A1* | 5/2015 | Chang | G06F 3/0442 345/173 |
| 2015/0130733 | A1* | 5/2015 | Chang | G06F 3/04166 345/173 |
| 2015/0130734 | A1* | 5/2015 | Chang | G06F 3/0446 345/173 |
| 2015/0130756 | A1* | 5/2015 | Chang | G06F 3/04166 345/174 |
| 2015/0130757 | A1* | 5/2015 | Chang | G06F 3/0446 345/174 |
| 2015/0130758 | A1* | 5/2015 | Chang | G06F 3/04162 345/174 |
| 2015/0188560 | A1* | 7/2015 | Huang | H03M 1/1285 341/122 |
| 2015/0301735 | A1* | 10/2015 | Hoch | G06F 3/04883 345/174 |
| 2015/0324029 | A1* | 11/2015 | Bakken | G06F 3/0442 345/174 |
| 2015/0355757 | A1 | 12/2015 | Hoch et al. | |
| 2016/0041210 | A1* | 2/2016 | Hogan | G06F 3/04166 702/65 |
| 2016/0148034 | A1* | 5/2016 | Kremin | G06V 40/1306 382/124 |
| 2016/0188105 | A1 | 6/2016 | Kremin et al. | |
| 2016/0342265 | A1* | 11/2016 | Geaghan | G06F 3/0446 |
| 2017/0010130 | A1* | 1/2017 | Xu | G06F 3/014 |
| 2017/0024064 | A1* | 1/2017 | Wigdor | G06F 3/0421 |
| 2017/0061188 | A1 | 3/2017 | Kremin et al. | |
| 2017/0192604 | A1* | 7/2017 | Stevenson | G06F 3/0443 |
| 2017/0199022 | A1* | 7/2017 | Anderson | G06F 3/0447 |
| 2017/0212635 | A1* | 7/2017 | Cordeiro | G06F 3/04182 |
| 2018/0129351 | A1* | 5/2018 | Qiao | G06F 3/04164 |
| 2019/0138151 | A1* | 5/2019 | Tsai | G06F 3/0418 |

FOREIGN PATENT DOCUMENTS

| | | |
|---|---|---|
| CN | 102754051 A | 10/2012 |
| CN | 103197817 A | 7/2013 |
| CN | 105659099 A | 6/2016 |
| CN | 106575183 A | 4/2017 |
| JP | 2015007912 A | 1/2015 |
| JP | 2015049771 A | 3/2015 |
| JP | 2015153109 A | 8/2015 |
| JP | 2016517095 A | 6/2016 |
| WO | 2014014493 A1 | 1/2014 |
| WO | 2016085560 A1 | 6/2016 |

OTHER PUBLICATIONS

Geoff Walker "A Review of technologies for sensing contact location on the surface of a display" Journal of the SID, published on Aug. 20, 2012; 28 pages.
International Search Report for International Application No. PCT/US18/62828 dated Feb. 1, 2019; 3 pages.
Written Opinion of the International Searching Authority for International Application No. PCT/US18/62828 dated Feb. 1, 2019; 5 pages.
Japanese Office Action for Application No. 2020-531118 dated Jun. 29, 2021; 3 pages.
China National Intellectual Property Administration Office Action for Application No. 201880077869.2 dated Mar. 9, 2023; 13 pages.

* cited by examiner

FIGURE 4B signal pattern sequence 1300 electrode index 1310 → 1 2 3 4 5 6 7 8 9 10

| | 1 | 2 | 3 | 4 | 5 | 6 | 7 | 8 | 9 | 10 |
|---|---|---|---|---|---|---|---|---|---|---|
| 1320(1) → | +1 | +1 | +1 | +1 | +1 | -1 | -1 | -1 | -1 | -1 |
| 1320(2) → | +1 | +1 | +1 | +1 | +1 | -1 | -1 | -1 | -1 | -1 |
| 1320(3) → | +1 | +1 | +1 | +1 | +1 | -1 | -1 | -1 | -1 | -1 |
| 1320(4) → | -1 | +1 | +1 | +1 | +1 | +1 | -1 | -1 | -1 | -1 |
| 1320(5) → | -1 | -1 | +1 | +1 | +1 | +1 | +1 | -1 | -1 | -1 |
| 1320(6) → | -1 | -1 | -1 | +1 | +1 | +1 | +1 | +1 | -1 | -1 |
| 1320(7) → | -1 | -1 | -1 | -1 | +1 | +1 | +1 | +1 | +1 | -1 |
| 1320(8) → | -1 | -1 | -1 | -1 | -1 | +1 | +1 | +1 | +1 | +1 |
| 1320(9) → | -1 | -1 | -1 | -1 | -1 | +1 | +1 | +1 | +1 | +1 |
| 1320(10) → | -1 | -1 | -1 | -1 | -1 | +1 | +1 | +1 | +1 | +1 |

HOVER SENSING WITH MULTI-PHASE SELF-CAPACITANCE METHOD

RELATED APPLICATIONS

This application claims priority to U.S. Provisional Application No. 62/598,347, filed on Dec. 13, 2017, which is incorporated by reference herein in its entirety.

TECHNICAL FIELD

This disclosure relates to the field of capacitance sensing and, in particular, to the sensing of hover inputs at capacitive touch sensing surfaces.

BACKGROUND

Computing devices, such as notebook computers, personal data assistants (PDAs), kiosks, and mobile handsets, have user interface devices, which are also known as human interface devices (HID). One type of user interface device is a touch-sensor pad (also commonly referred to as a touchpad), which can be used to emulate the function of a personal computer (PC) mouse. A touch-sensor pad replicates mouse X/Y movement by using two defined axes which contain a collection of sensor electrodes that detect the position of one or more objects, such as a finger or stylus. The touch-sensor pad provides a user interface device for performing such functions as positioning a pointer, or selecting an item on a display. Another type of user interface device is a touch screen. Touch screens, also known as touchscreens, touch windows, touch panels, or touchscreen panels, are transparent display overlays that allow a display to be used as an input device, removing the keyboard and/or the mouse as the primary input device for interacting with the display's content. Other user interface devices include buttons, sliders, etc., which can be used to detect touches, taps, drags, and other gestures.

Capacitance sensing systems are increasingly used for implementing these and other types of user interface devices, and function by sensing electrical signals generated on electrodes that reflect changes in capacitance. Such changes in capacitance can indicate a touch event or the presence of a conductive object, such as a finger, near the electrodes. The capacitance changes of the sensing electrodes can then be measured by an electrical circuit that converts the capacitances measured from the capacitive sense elements into digital values to be interpreted by a host device. However, the accuracy of existing capacitance measurement circuits can be degraded by noise and fluctuations affecting the drive voltages, current source outputs, switching frequencies, and other signals within the measurement circuit. Such measurement inaccuracy can result in inaccurate positioning or touch detection in a capacitance-based user interface device.

BRIEF DESCRIPTION OF THE DRAWINGS

The present disclosure is illustrated by way of example, and not by way of limitation, in the figures of the accompanying drawings.

FIGS. 4A and 4B illustrate sequences of excitation signal patterns for a hover sensing process, according to an embodiment.

FIGS. 13A-13C illustrate sequences of excitation signal patterns for which one sensor electrode is measured for each pattern, according to an embodiment.

DETAILED DESCRIPTION

Figure 1:
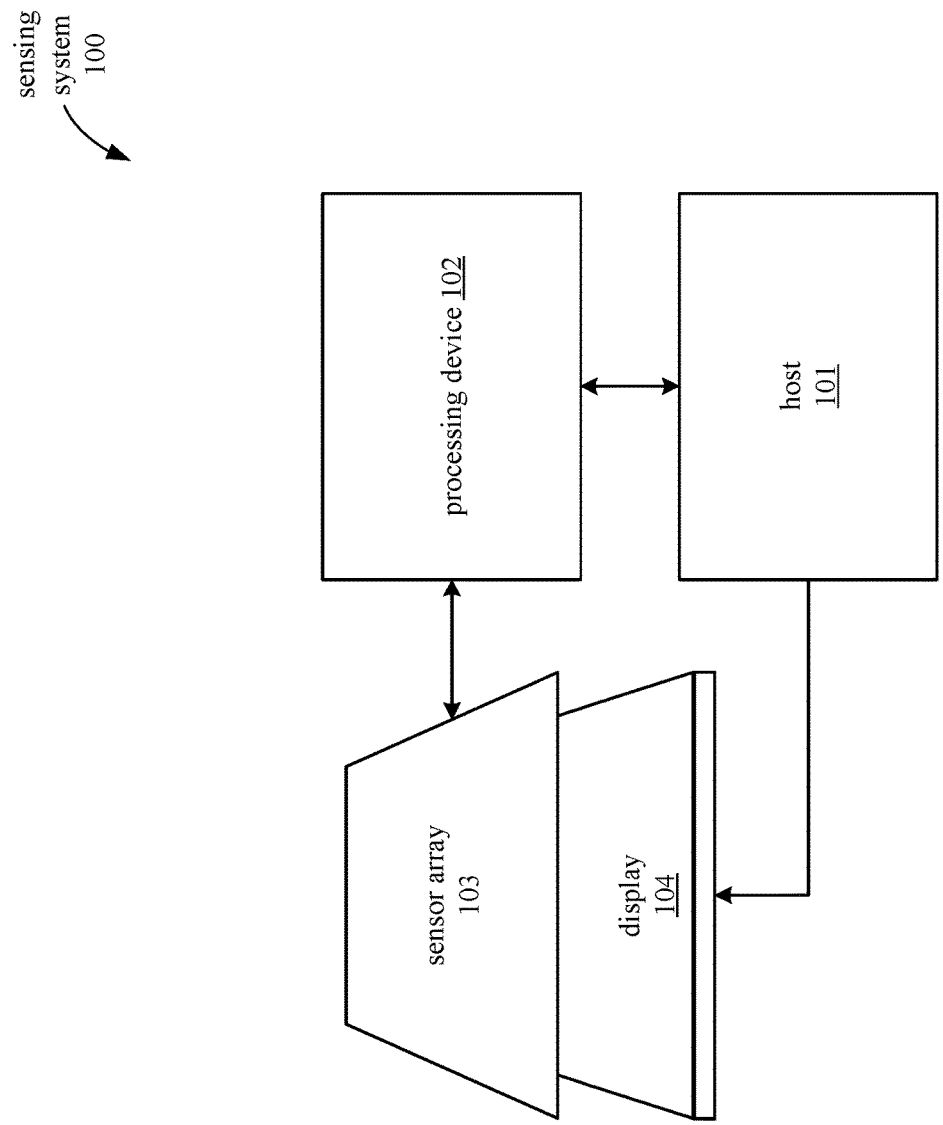
FIG. 1 is a block diagram illustrating a capacitance sensing system, according to an embodiment.

The following description sets forth numerous specific details such as examples of specific systems, components, methods, and so forth, in order to provide a good understanding of several embodiments of the claimed subject matter. It will be apparent to one skilled in the art, however, that at least some embodiments may be practiced without these specific details. In other instances, well-known components or methods are not described in detail or are presented in a simple block diagram format in order to avoid unnecessarily obscuring the claimed subject matter. Thus, the specific details set forth are merely exemplary. Particular implementations may vary from these exemplary details and still be contemplated to be within the spirit and scope of the claimed subject matter.

For a computing device that is capable of accepting input via a capacitive sensing surface, such as a touchscreen or trackpad, a hover input is caused by an object (such as a user's finger or a stylus) that is near but not touching the sensing surface. For example, a hover input can be detected when a user's finger is held above the touch sensing surface. The computing device determines the location on the sensing surface that is nearest to the finger as the input location. A computing device that is capable of hover sensing can detect inputs from a user when the user is unable or unwilling to physically touch the device, such as when the user is wearing gloves, the user's fingers are wet or dirty, the device is inside a protective case, etc. A hover input at a particular location on the sensing surface can be distinguished from a touch input at the same location; accordingly, hover sensing can be used to perform additional types of actions in the computing device (e.g., previewing documents, opening submenus, etc.) that are not initiated by touch inputs.

In one embodiment, a computing device performing hover sensing is capable of detecting a finger at a range of at least 35 millimeters from the sensing surface. As an example, a typical capacitance between a finger and an indium tin oxide (ITO) sensor electrode can be approximately 15-30 femtofarads (fF) at this distance, depending on the finger and electrode characteristics and relative positions. As a result, hover sensing is effectively performed using low-noise and high-resolution charge-to-digital conversion circuits that are able to distinguish tiny capacitance changes in the presence of relatively large parasitic capacitances. Temperature drift in the large parasitic capacitances in combination with internal and external noise sources (e.g. liquid crystal display (LCD) noise) substantially complicates the detection of hover inputs, and can result in false inputs, failure to detect real hover inputs, position jitter, and other operational artefacts. In addition, emission limits imposed in some industries (e.g., in automotive or aeronautics applications) constrain the sizes of sensing surfaces and the magnitudes of drive signals that are applied to sensor electrodes for performing hover sensing operations.

In one embodiment, a computing device detects hover inputs at a sensing surface by applying a sequence of zero-sum patterns of excitation signals to an array of sensor electrodes in the sensing surface. The device applies complementary transmit (TX) excitation signals (i.e., a positive phase and a negative phase of an excitation signal) to the sensor electrodes, with positive and negative phase signals applied to equal numbers of electrodes so that emissions induced by the excitation signals are cancelled at a sufficient distance from the sensor electrodes.

In one embodiment, an initial TX signal pattern includes positive phase excitation signals applied to a subset of contiguous sensor electrodes while negative phase excitation signals are applied to a complementary subset of the sensor electrodes. Through application of the subsequent TX signal patterns in the sequence, the initial excitation signal pattern is rotated in circular fashion through the sensor electrodes. The application of the sequence of TX excitation signal patterns causes a sequence of receive (RX) signals to be generated at the sensor electrodes, which is affected by hover inputs near the sensor electrodes.

A least squares approximation is performed to determine parameters for a predetermined function for approximating the measured sequence of RX signals. In one embodiment, a hover input near the sensor electrodes results in a sequence of RX signals that resembles a sine function; accordingly, the least squares approximation determines the parameters of the sine function for approximating the sequence of RX signals. The position of the hover input relative to the sensor electrodes is determined by calculating a displacement parameter for the sine function that approximates the measured RX signal sequence.

A correlation coefficient is calculated that describes the degree of correlation between the measured RX signal sequence and the sine function approximating the RX signal sequence. Actual hover inputs caused by a finger or other conductive object near the sensor electrodes cause an RX signal sequence to be measured that resembles a sine function, while signals caused by temperature changes or other unintentional inputs do not. Thus, the correlation coefficient is compared to a correlation threshold, and a hover input is detected when the correlation coefficient exceeds the threshold (i.e., indicating a sufficiently high degree of similarity between the measured RX signal sequence and the approximating sine function).

The above approach for detecting a hover input results in a substantial increase in the measurable capacitance signal resulting from the hover input. Signal to noise ratio is also improved. Accordingly, hover inputs are detectable at greater distances from the sensing surface, and with greater immunity to noise (e.g., from a nearby LCD panel). In addition, measurement inaccuracies due to changes in parasitic capacitances of the sensing surface (e.g., due to temperature drift) are substantially reduced, as these changes are compensated by the zero-sum TX excitation signal patterns. Lower electromagnetic emissions are also achieved by the zero-sum TX excitation signal patterns.

FIG. 1 illustrates a block diagram of a capacitance sensing system 100, according to an embodiment. The sensing system 100 includes a host device 101, a processing device 102, and a sensor array 103. In one embodiment, the sensor array 103 is constructed from a transparent conductive material such as indium tin oxide (ITO) and overlies a display 104. The host device 101 controls the display 104 and updates the display 104 in response to the objects detected based on self capacitances and mutual capacitances measured from the sensor array 103 so that the display 104 and sensor array 103 function together as a touch screen. In one embodiment, the functions of the processing device 102 are integrated into a single integrated circuit with the host device 101.

Figure 2:
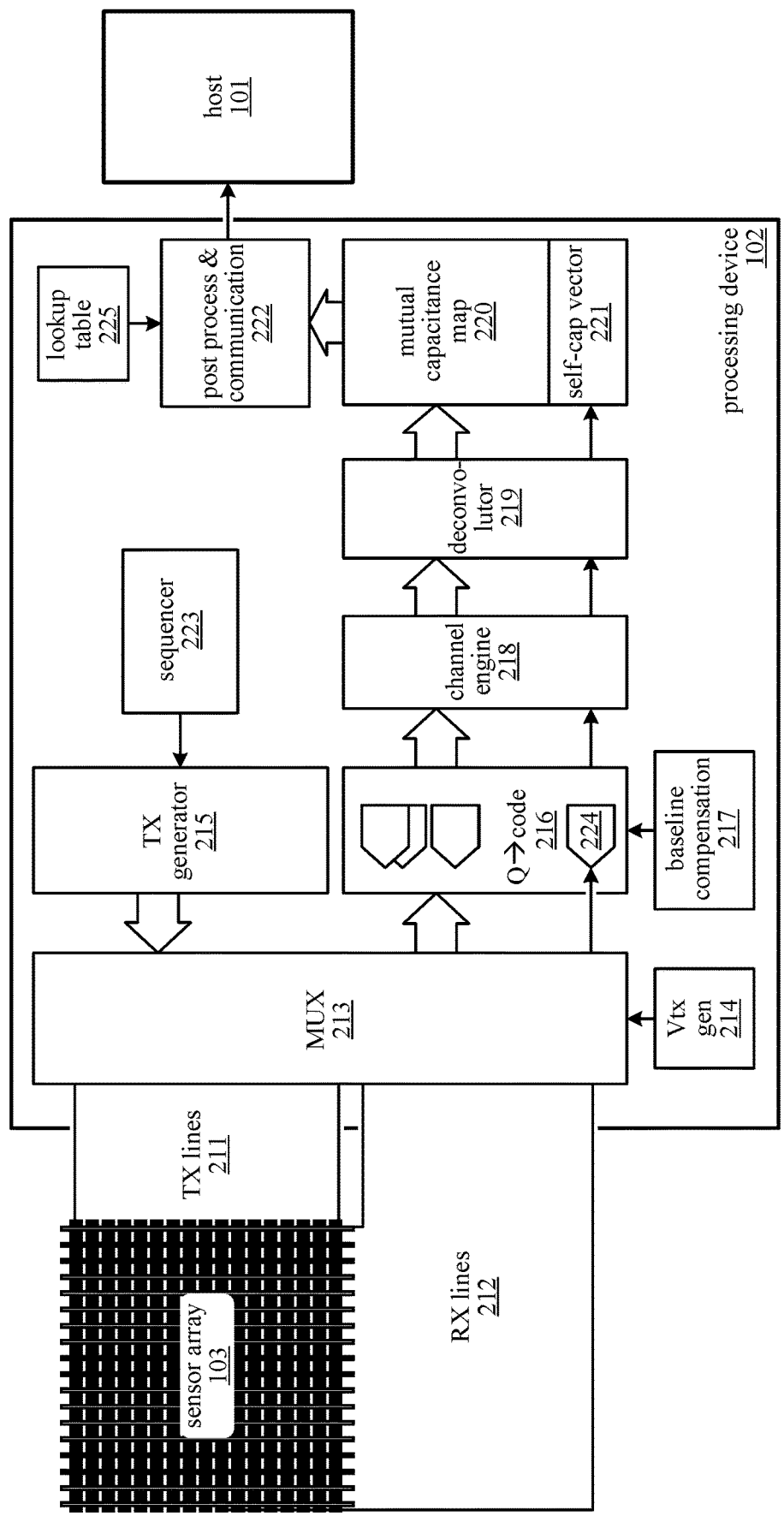
FIG. 2 is a block diagram illustrating components in a processing device of a capacitance sensing system, according to an embodiment.

FIG. 2 illustrates a functional block diagram of components in the capacitance sensing system 100 that perform sensing of hover inputs, according to an embodiment. The processing device 102 is capable of measuring signals (e.g., voltage and/or current) representing self capacitances and mutual capacitances of electrodes in the capacitive sensor array 103. The sensor array 103 includes a set of one or more TX sensor electrodes and a set of one or more RX sensor electrodes. Each of the TX sensor electrodes is connected to the processing device 102 via one of the TX lines 211, while each of the RX sensor electrodes is connected to the processing device 102 via one of the RX lines 212. For mutual capacitance sensing, the TX lines 211 are used to apply excitation signals to the TX sensor electrodes, while the RX lines 212 are used to receive the induced signals from the RX sensor electrodes. In other operational modes (e.g., multiphase self capacitance sensing), either or both of the TX lines 211 and RX lines 212 can also be configured to transmit signals to and/or receive signals from the sensor electrodes when measuring capacitance values. The processing device 102 performs processing on the measured capacitance values to distinguish between intentional touches and non-intentional touches (e.g., liquid on the sensor surface) and to determine locations of the intentional touches. The processing device 102 also detects hover inputs based on RX signal sequences generated from the sensor array 103. The host device 101 responds to a detected hover input by executing a subroutine associated with the hover input. In one embodiment, the subroutine executed is additionally determined based on the location of the hover input. In one embodiment, the host device 101 executes different subroutines for a hover input and an intentional touch input at the same location.

The processing device 102 reports the locations of intentional touches and hover inputs to the host device 101. The host device 101 executes one or more functions based on the reported input locations. In one embodiment, the processing device 102 reports the measured signals representing changes in self capacitances and/or mutual capacitances to the host device 101, and further processing of the measured values is performed in the host device 101. The processing device 102 may report the raw measurement values to the host 101, or perform preliminary processing on the raw measurement values (e.g., baseline correction, or filtering) prior to reporting them to the host 101.

The processing device 102 includes a number of components for supplying excitation signals to the sensor array 103, measuring the resulting signals (e.g., current or charge) from the sensor array, and calculating measures of the self capacitances and mutual capacitances (i.e., values representing the self capacitances and mutual capacitances) based on the measurements. The multiplexer 213 includes switching circuitry that selectively connects the different sensor electrodes to excitation signals or measurement channels. In one embodiment, the multiplexer 213 is implemented using a number of multiplexers. For example, separate multiplexers can be used for the TX lines 211 and for the RX lines 212, or for column and row electrodes. In one embodiment, several multiplexers can be used for each axis, depending on the number of inputs, the drive and receive configurations, and the size of the multiplexers. The TX generator 215 controls the multiplexer 213 to generate a TX signal as an excitation signal that is selectively applied to the TX sensor electrodes in the array 103 via the TX lines 211. Vtx generator 214 generates a voltage Vtx that can be selectively applied to the sensor electrodes when generating the TX excitation signal. In one embodiment, Vtx generator 214 includes an inverter so that both positive phase (+1) and negative phase (−1) signals can be generated. Multiplexer 213 can also selectively apply a ground voltage to the sensor electrodes. The specific sequences of excitation signals that are applied to the sensor array 103 over time are generated by the sequencer circuit 223.

Multiplexer 213 can also selectively connect the electrodes in sensor array 103 to the charge-to-code converters 216 so that the amounts of charge generated by excitation of the electrodes can be measured. In one embodiment, the charge-to-code converters 216 integrate current over a set time period and convert the resulting measured charge to a digital code that can be used for further processing. The charge to code converters 216 include at least one RX channel 224 for receiving an RX signal from the sensor array 103. The baseline compensation circuit 217 supplies a baseline compensation signal to the capacitance-to-code converters 216 that reduces the effect of a baseline level of the sensor array. Alternatively, the baseline compensation circuit 217 may apply the compensation signal to a shield electrode under the sensor array 103. The compensation level can be set for the entire panel, or can be set at different levels for different excitation signal patterns depending on the parasitic capacitance variations of the panel sense electrodes.

The channel engine 218 receives the digital codes representing the charge measured from each electrode. For some sensing methods (e.g., multiphase self-capacitance sensing with nonzero-sum TX excitation patterns), the channel engine 218 supplies the raw digital code values to the deconvolutor module 219. The deconvolutor 219 performs deconvolution operations on the values to generate a mutual capacitance map 220 and a self capacitance vector 221. The mutual capacitance map 220 is represented as a matrix of values having dimensions corresponding to the number of row electrodes and column electrodes in the sensor array, so that a mutual capacitance for each intersection between one of the row electrodes and one of the column electrodes is represented by an element (i.e., a measure of the mutual capacitance) in the matrix. The self capacitance vector includes an element for each TX electrode (e.g., row electrode), representing the self capacitance of the TX electrode (i.e., a measure of the self capacitance).

The mutual capacitances 220 and self capacitances 221 are transmitted to the post processing and communication block 222. The post processing block 222 performs additional calculations to detect the presence of any intentional touches and to determine the locations of any such touches based on the capacitances 220-221. The touch locations are transmitted from block 222 to the host device 101.

In one embodiment, when the processing device 102 performs hover sensing, the generated sequence of RX signals is received by the channel engine 218 and stored in the self-capacitance vector 221, bypassing the deconvolutor 219 which is used in other modes of operation. The post processing block 222 determines parameters of a sine function that approximates the RX signal sequence based on a least squares approximation. In one embodiment, values for the sine function are calculated using the lookup table 225. The post processing block 222 calculates a measure of correlation (e.g., a correlation coefficient) indicating the degree of correlation between the RX signal sequence and the approximating sine function, then detects the presence of an object (e.g., the user's finger) proximate to the sensor array 103 based on the correlation coefficient. In particular, if the correlation coefficient exceeds a predetermined correlation threshold (i.e., the RX signal sequence is sufficiently similar to the approximating sine function), the presence of the object is detected.

Figure 3:
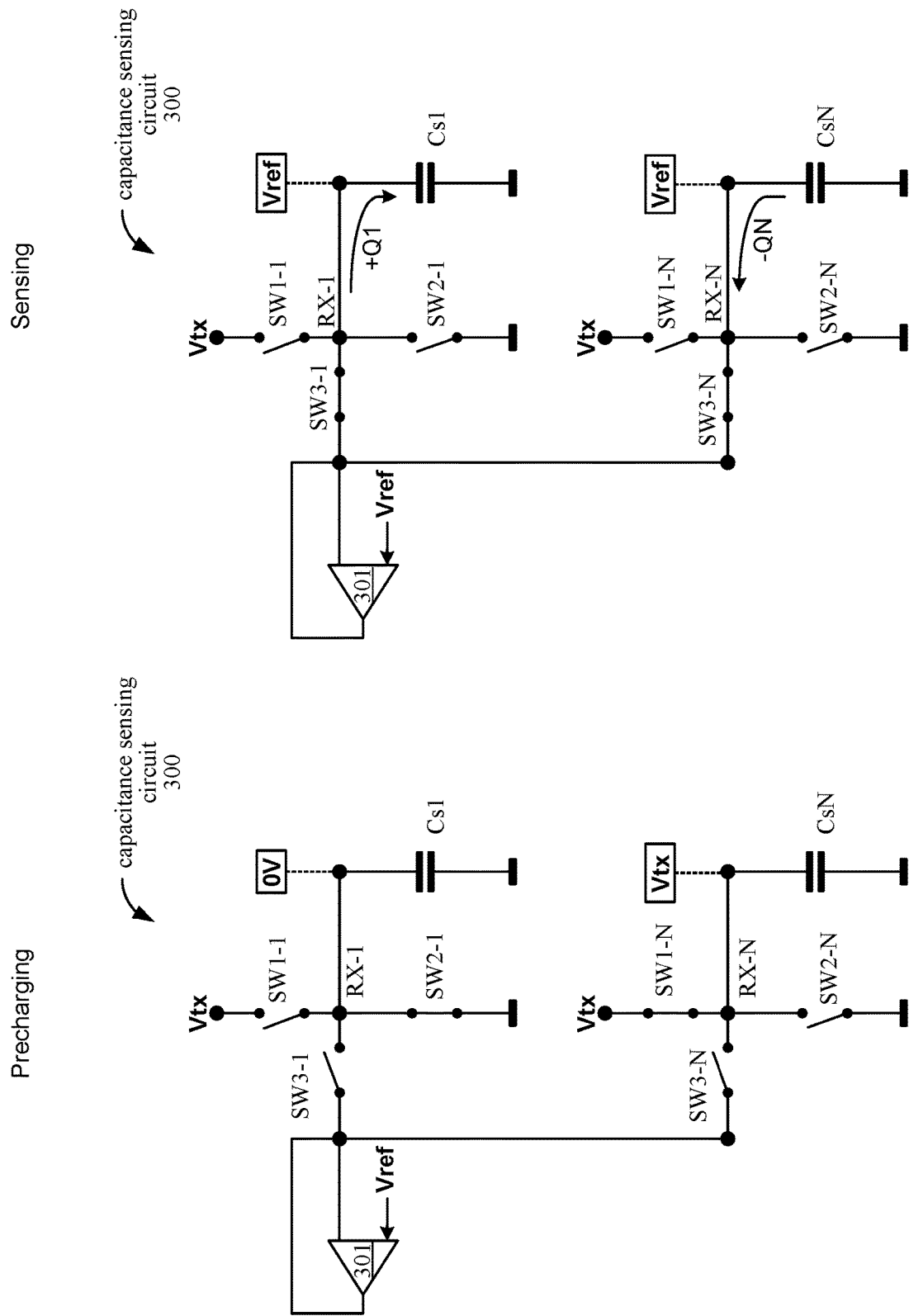
FIG. 3 illustrates circuit diagrams for stages of a multi-phase sensing process, according to an embodiment.

FIG. 3 illustrates two stages in the operation of a capacitance sensing circuit 300 that performs multiphase self capacitance sensing, according to an embodiment. The capacitance sensing circuit 300 measures self capacitances for two electrodes RX-1 and RX-N, representing the first RX electrode and the Nth RX electrode in the sensor array 103. The capacitances Cs1 and CsN represent the self capacitances of electrodes RX-1 and RX-N, respectively.

During the precharging stage, the sensing electrodes RX-1 and RX-N are isolated from the sensing channel 301 by opening switches SW3-1 and SW3-N. The sensing electrodes RX-1 and RX-N are accordingly isolated from each other and can be precharged to different voltages. In the sensor array 103 as a whole, some electrodes can be precharged to Vtx while others are precharged to ground. As illustrated, SW2-1 is closed while SW1-1 is open so that electrode RX-1 is connected to ground and RX-N is connected to Vtx. The self capacitances Cs1 and CsN are thus precharged to ground and Vtx, respectively.

During the sensing stage, the switches SW2-1 and SW2-N are opened to disconnect the sensor electrodes RX-1 and RX-N from their respective precharging voltages. The sensor electrodes RX-1 and RX-N are connected to the sensing channel 301 by closing the switches SW3-1 and SW3-N. The voltage Vref is maintained at each of the electrodes RX-1 and RX-N. Charge Q1 flows into the self capacitance Cs1 of electrode RX-1, since RX-1 was precharged to a lower voltage than Vref. Charge QN flows out of the self capacitance CsN since RX-N was precharged to a higher voltage Vtx than Vref. When this process is performed for all of the RX electrodes (RX-1, RX-2 . . . RX-N) in the sensor array 103, the sensing channel 301 receives charge Qin according to Equation 1 below:

$$Q_{in} = Q_1 + Q_2 + \ldots + Q_N;$$ (Equation 1)

In Equation 1, the values (Q1, Q2, . . . QN) represent the charge that is stored in the self capacitances (Cs1, Cs2, . . . CsN), respectively, after the precharging stage. Equation 1 can be rewritten as shown in Equation 2 below:

$$Qin = S1 \cdot Utx \cdot Cs1 + S2 \cdot Utx \cdot Cs2 + \ldots + Sn \cdot Utx \cdot CsN =$$ (Equation 2)

$$= Utx \cdot [S1 \ S2 \ \ldots \ Sn] \cdot \begin{bmatrix} Cs1 \\ Cs2 \\ M \\ CsN \end{bmatrix} = Utx \cdot S \cdot Csx;$$

In Equation 2, (S1-Sn) represents the excitation sequence for a measurement cycle represented by elements of 1, −1, and 0. A value of 1 indicates that excitation in a positive direction, a value of −1 indicates excitation in a negative direction, and a value of 0 indicates that no excitation voltage is applied to the sensor electrode. Accordingly, Utx represents the change in voltage applied to the electrode from the precharge stage to the sensing stage. As indicated in Equation 2, Utx is the same for all electrodes; in alternative embodiments, Utx may differ between electrodes.

If the sensor is excited with N different excitation sequences serially, the excitation procedure can be represented as an excitation matrix S with values S11-SNN, as indicated in Equation 3 below.

$$Qin = Utx \cdot \begin{bmatrix} S11 & S21 & L & SN1 \\ S12 & S22 & L & SN2 \\ M & M & O & M \\ S1N & S2N & L & SNN \end{bmatrix} \cdot \begin{bmatrix} Cs1 \\ Cs2 \\ M \\ CsN \end{bmatrix} = Utx \cdot S \cdot Csx;$$ (Equation 3)

In the excitation matrix S, elements in the same row (e.g., S11, S21, . . . SN1) are applied to different electrodes at the same time, while elements in the same column (e.g., S11, S12, . . . S1N) are applied to the same electrode at different times. If the excitation matrix S has an inverse form $S^{-1}$, the sensed self capacitances can be determined by performing a deconvolution of the measured charge values Qin as follows in Equation 4 below, where D is the deconvolution matrix:

$$Csx = \frac{\begin{bmatrix} D11 & D21 & L & DN1 \\ D12 & D22 & L & DN2 \\ M & M & O & M \\ D1N & D2N & L & DNN \end{bmatrix} \cdot \begin{bmatrix} Qin1 \\ Qin2 \\ M \\ QinN \end{bmatrix}}{Utx} = \frac{D \cdot Qin}{Utx}; D = S^{-1};$$ (Equation 4)

Excitation of the sensor electrodes with a combination of opposite-phase signals reduces emissions of the sensor as compared to the excitation of all of the row or column sensor electrodes in-phase. The emission depends on the sum of the excitation sequence elements (e.g., S11-SNN). For example, if the sum of elements is equal to 1, the emission observable at a distance is similar to the emission generated by excitation of a single electrode. In addition, charge measurements for multiple sensor electrodes are included in the deconvolution calculation, which results in an averaging effect after the deconvolution that, in turn, renders the sensing result less sensitive to noise injected into the sensor. In one embodiment, the approaches for sensing hover inputs as described herein can be used with multiple charge-to-code sensing circuits (e.g. that use different sensing channels based on active integrators, current conveyors, etc.) that support multiphase self or mutual capacitance sensing approaches.

Figure 4A:
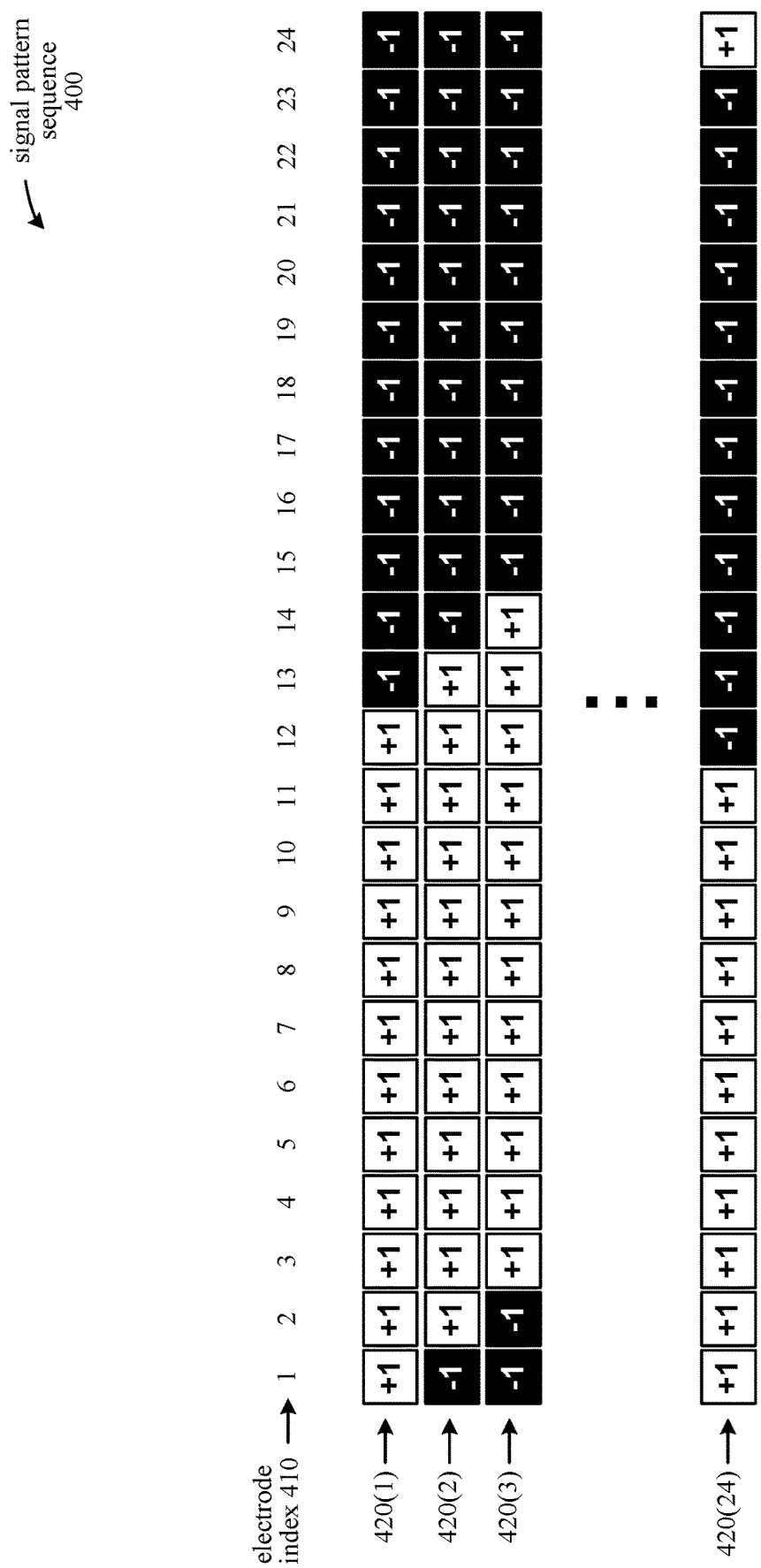

FIG. 4A illustrates a sequence of TX signal patterns that are applied to sensor electrodes in a sensor array during hover sensing, according to an embodiment. As illustrated in FIG. 4A, each of the sensor electrodes is referenced by its index 410. In one embodiment, the electrodes 1-24 are row electrodes (or alternatively, column electrodes) in the sensor array 103, with the electrode indexes 410 corresponding to the spatial order of the electrodes in the array 103. The TX generator 215 applies each of the TX signal patterns 420 in sequential order to the sensor electrodes in the sensor array 103.

When each signal pattern 420(1)-420(24) is applied, the individual TX excitation signals in the pattern are applied by the TX generator 215 to respective sensor electrodes 1-24 at the same time, with '+1' and '−1' indicating positive and negative phases of the excitation signal, respectively. For example, the TX generator 215 applies pattern 420(1) to the sensor electrodes 1-24 by applying a positive phase excitation signal to electrodes 1-12 while applying a negative phase excitation signal to electrodes 13-24. In one embodiment, the positive and negative phase signals are complementary signals, where the negative phase excitation signal is the inverse of the positive phase excitation signal.

Each of the signal patterns 420 is a zero-sum excitation signal pattern; that is, the magnitude of the sum of the excitation signals in the pattern ideally approaches zero. For example, excitation signal pattern 420(1) includes twelve positive phase excitation signals (applied to electrodes 1-12) and twelve negative phase excitation signals (applied to electrodes 13-24). Thus, each of the positive phase excitation signals is summed with a corresponding complementary negative phase excitation signal so that the sum of all the signals in the pattern is nominally zero. In practice, the sum of the excitation signals in the pattern can deviate from zero due to manufacturing tolerances, environmental conditions, etc.

In one embodiment, the magnitude of the sum of the excitation signals in a pattern is less than the magnitude of any one of the excitation signals in the pattern. Accordingly, the entire zero-sum excitation signal pattern generates less electromagnetic emission than singly applying one of the excitation signals to its corresponding sensor electrode. In one embodiment, the sensor array includes an even number of sensor electrodes, and the positive and negative phase excitation signals are each applied to half of the sensor electrodes so that an equal number of electrodes are excited by the positive phase excitation signal as with the negative phase excitation signal, thus achieving a balanced excitation scheme.

For each of the excitation signal patterns 420, the TX generator 215 applies all of the positive phase excitation signals to a contiguous subset of sensor electrodes, which are contiguous in a circular sequence of the set of sensor electrodes. The circular sequence of the electrodes proceeds in order from index 1 to index 24, then returns to index 1 after index 24 and repeats. Accordingly, in signal pattern 420(24), the electrodes 24 and 1-11 to which the positive phase excitation signal are applied are contiguous in the circular sequence. All of the negative phase excitation signals are also applied to a contiguous subset of electrodes that are contiguous in the circular sequence.

In one embodiment, the same excitation signal is applied to a subset of sensor electrodes by physically connecting the electrodes together by a conductive path (e.g., via switching circuitry) and applying the excitation signal to the connected electrodes. In an alternative embodiment, each of the sense electrodes is separately driven with the same excitation signal. In one embodiment, a majority of the electrodes (i.e., at least half of the electrodes) in the set of sensor electrodes are included in subsets each including at least three or more contiguous sensor electrodes to which the same excitation signal (e.g., the positive phase excitation signal or the negative phase excitation signal) is applied for each signal pattern.

Circular rotation is used to generate successive signal patterns in the sequence 400. In sequence 400, twelve positive phase excitation signals and twelve negative phase excitation signals are circularly rotated through the sensor electrodes to form 24 different excitation signal patterns 420. For each signal pattern 420 in the sequence 400, the sequencer circuit 223 generates the next subsequent excitation signal pattern in the sequence by circularly rotating the pattern by an increment of one; that is, each sensor electrode in the next subsequent pattern receives the excitation signal that was applied to a preceding (i.e., lower indexed) sensor electrode in the circular sequence. For example, in pattern 420(2), a negative phase excitation signal is applied to electrode 1 since the negative phase excitation signal was previously applied to electrode 24 (which precedes electrode 1 in the circular sequence) in the prior excitation signal pattern 420(1). In pattern 420(2), a positive phase excitation signal is applied to electrode 13 because a positive phase excitation signal was applied to electrode 12 in the preceding pattern 420(1).

Figure 4B:
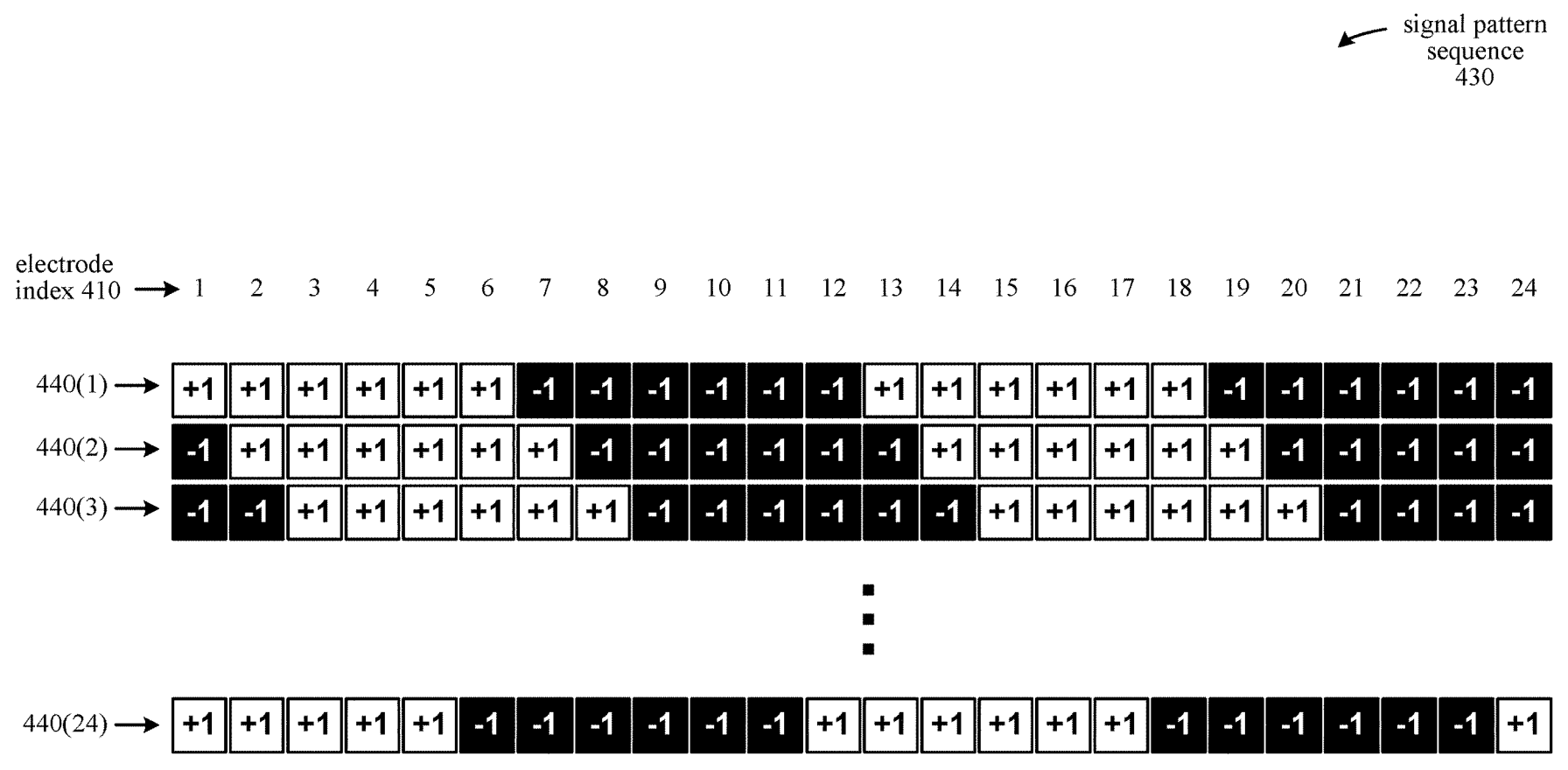

FIG. 4B illustrates an alternative sequence 430 of circularly rotated TX signal patterns that can be applied to sensor electrodes in a sensor array during hover sensing, according to an embodiment. The TX generator 215 applies each of the TX signal patterns 440 in sequential order to the sensor electrodes in the sensor array 103. In the signal patterns 440, the sensor electrodes to which the positive (or negative) phase excitation signal is applied are divided into two groups. In pattern 440(1), the positive phase excitation signal is applied to electrodes 1-6 and 13-18, while the negative phase excitation signal is applied to electrodes 7-12 and 19-24.

When other nonzero-sum TX excitation patterns sequences are used in multiphase capacitive sensing, deconvolution can be used to determine the measured capacitance values from the raw data. However, the convolution matrixes for zero-sum signal patterns such as patterns 420 and 430 are singular. Therefore, instead of deconvolution, a least squares approximation calculation to match a predetermined function (e.g., a sine function) with the measured sequence of RX signals is performed to determine the presence and location of a hover input relative to the sensor electrodes.

In one embodiment, according to the multiphase sensing process, after the precharging phase in which the positive or negative phase excitation signal is applied to the sensor electrode, an RX self-capacitance sensing channel 224 in the charge to code converter 216 measures an RX signal for each sensor electrode during a sensing phase. In one embodiment, an RX signal is measured for each excitation signal pattern. The measured RX signals make up a sequence of RX signals that is correlated with a predetermined function, such as a sine function, to determine whether a hover input is present.

Figure 5A:
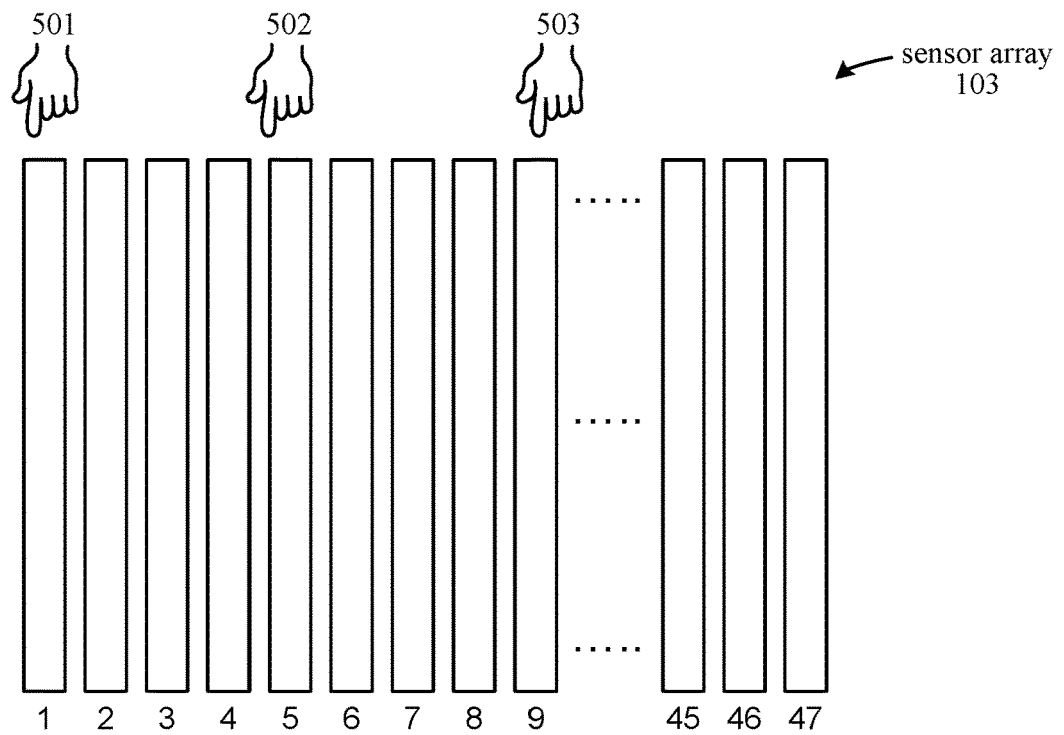
FIGS. 5A and 5B illustrate hover inputs at different locations of a sensor array and the measured signals corresponding to the hover inputs, according to an embodiment.
Figure 5B:
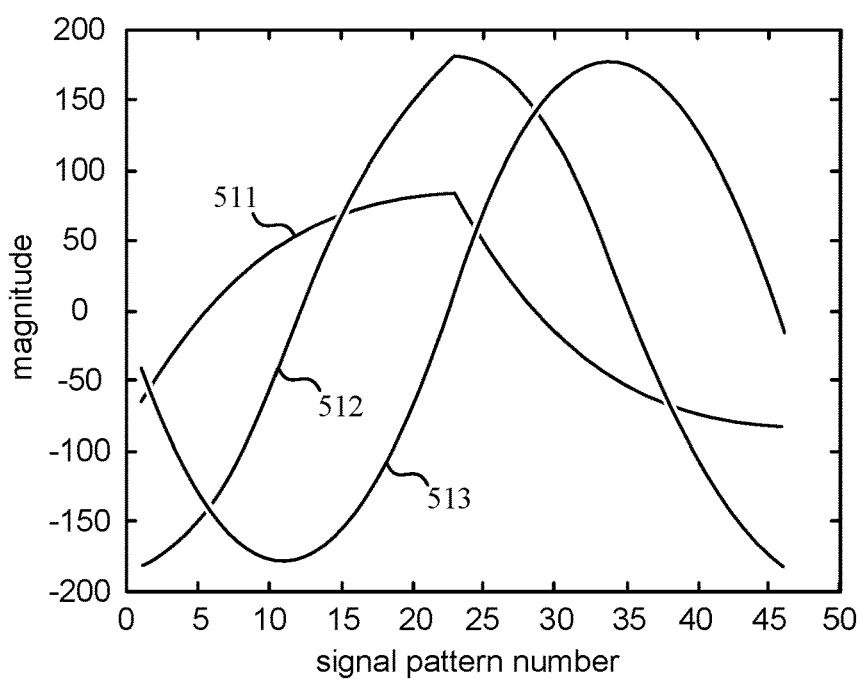

FIGS. 5A and 5B illustrate RX signal sequences resulting from hover inputs near different locations on a sensor array 103, according to an embodiment. As illustrated in FIG. 5A, the sensor array 103 has 47 sensor electrodes. Thus, a circularly rotated sequence of excitation signal patterns includes 47 different patterns that are applied to the sensor electrodes in sequence. In FIG. 5B, the vertical axis represents a signal level of the RX signal as sensed by the RX sensing channel 224, and the horizontal axis represents the pattern number of the excitation signal pattern that induced the RX signal.

FIG. 5B illustrates RX signal sequences 511, 512, and 513 resulting from respective hover inputs 501, 502, and 503 at different locations of the sensor array 103. Hover input 501 is located at an edge of the sensor array 103, while hover inputs 502 and 503 are progressively nearer to the center of the array 103. Each of the measured RX signal sequences 511-513 resembles a sine function; thus, a sine function is used to approximate each of the RX signal sequences 511-513 by least squares approximation.

A sine function is expressed generally in terms of parameters a, b, c, and d in Equation 5:

$$y = a + b \cdot \sin(c \cdot i + d) \quad \text{(Equation 5)}$$

Figure 6A:
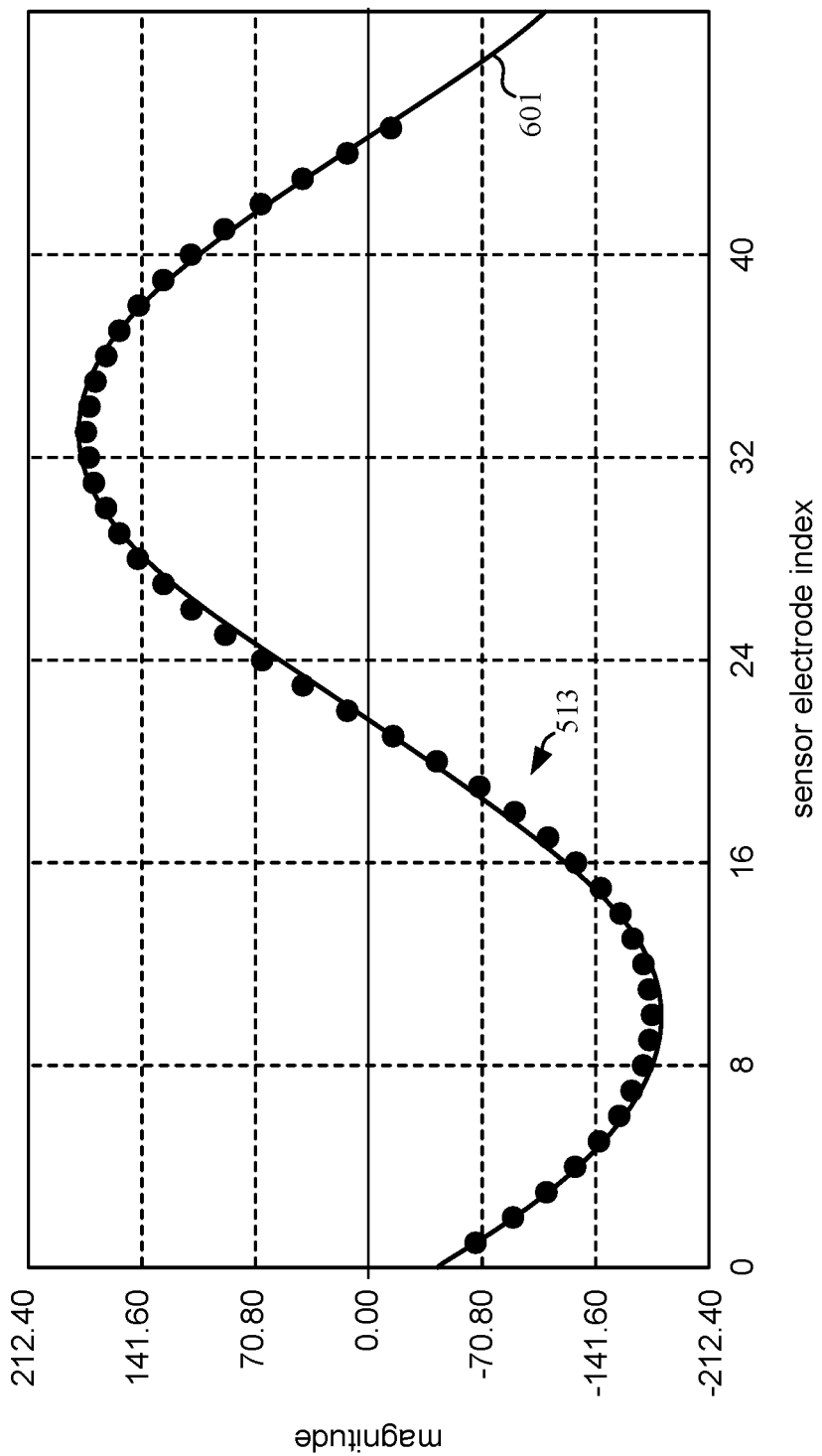
FIGS. 6A-6C illustrate least squares approximations of measured signal sequences by sine functions, according to an embodiment.
Figure 6B:
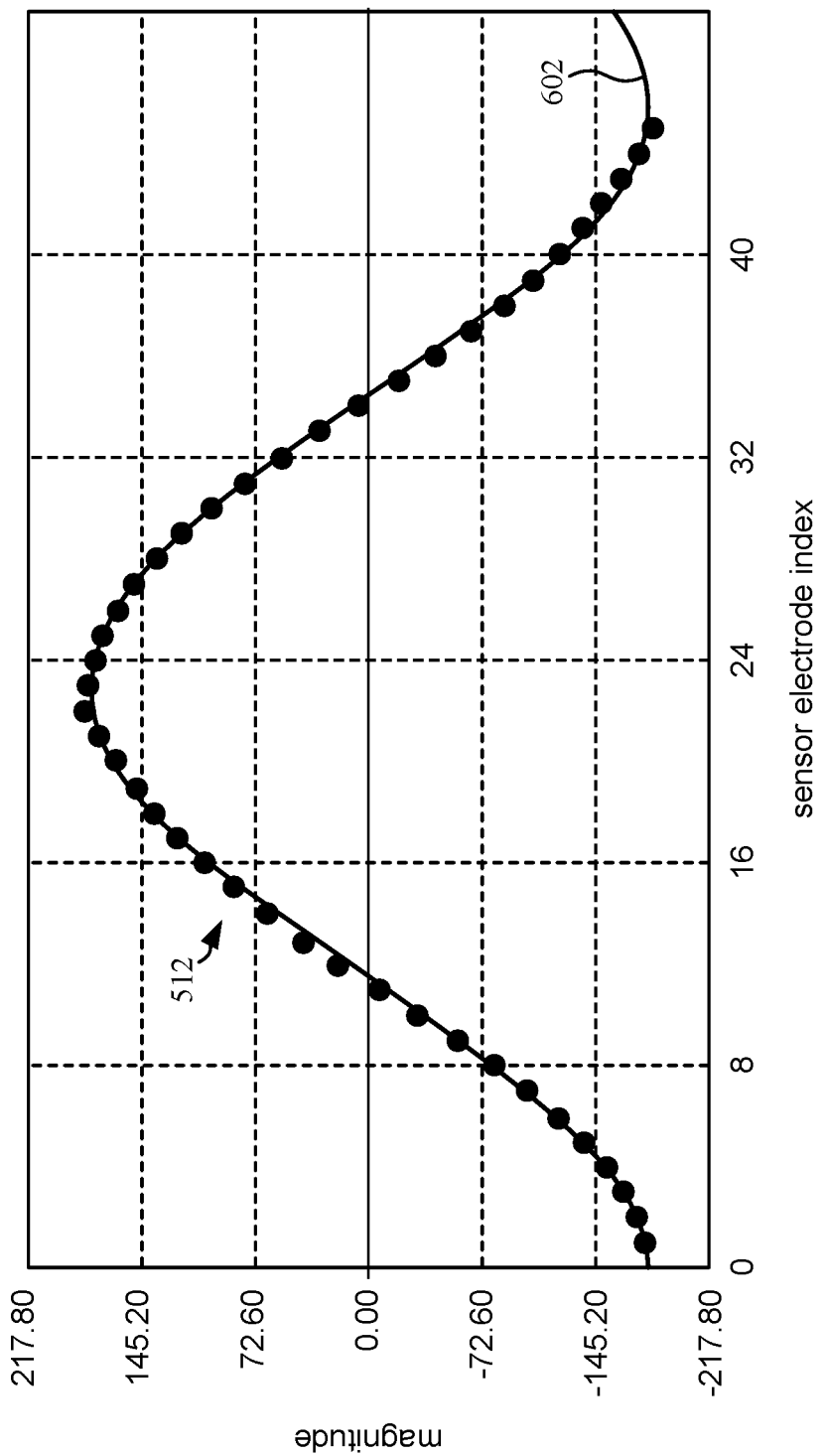
Figure 6C:
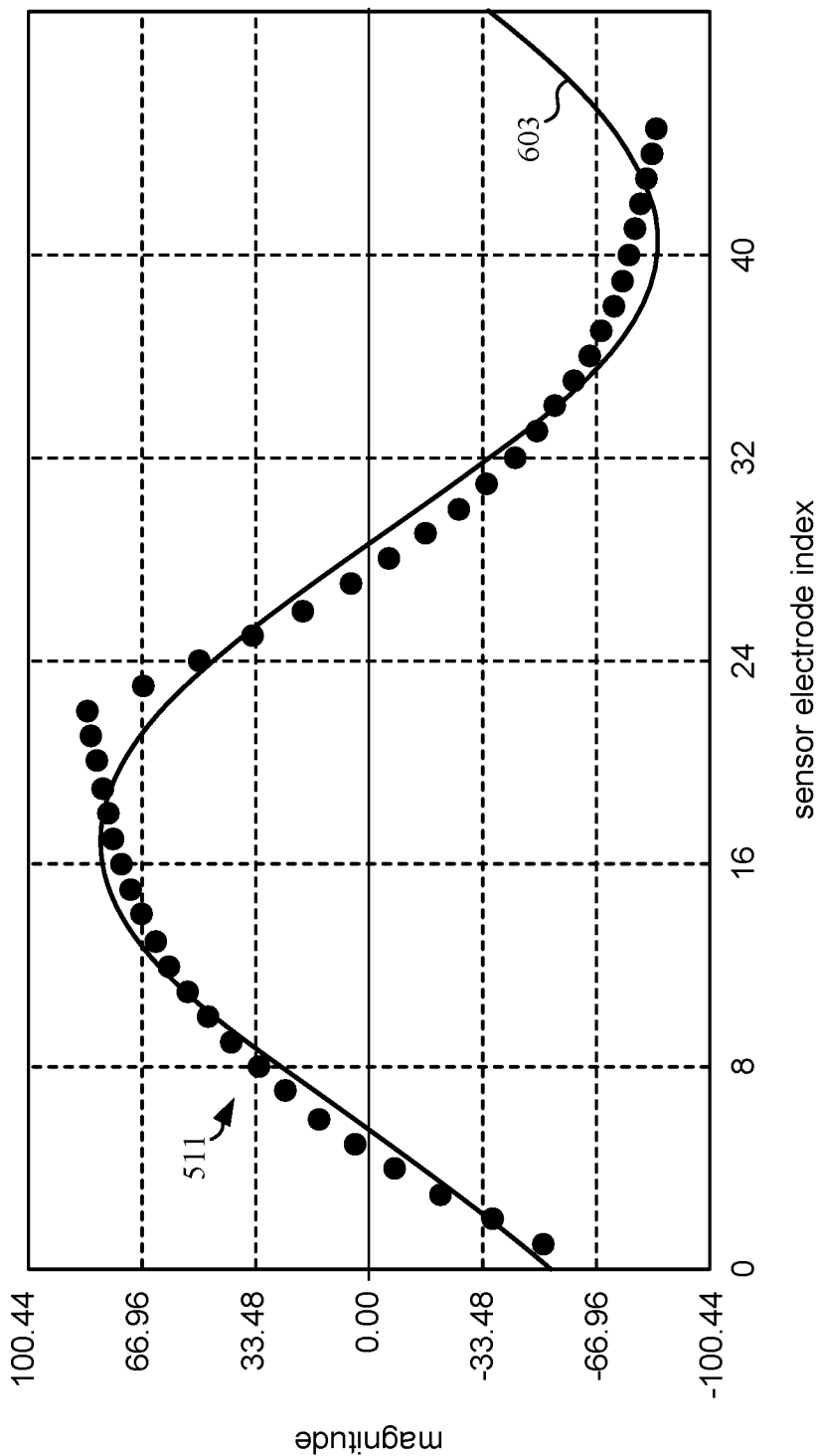

In Equation 5, y is the magnitude of the sine function, which corresponds to the magnitude of the RX signal, and i is the sensor electrode index. The parameter d reflects the phase shift of the sine function, and is directly related to the hover position at the sensor array 103. FIGS. 6A, 6B, and 6C illustrate approximations of RX signal sequences 513, 512, and 511, respectively, by sine functions having different parameters, according to an embodiment. In FIG. 6A, the RX signal sequence 513 is approximated by a sine function 601 (illustrated as a continuous line). In FIG. 6B, the RX signal sequence 512 is approximated by a sine function 602. In FIG. 6C, the RX signal sequence 511 is approximated by a sine function 603. Each of the approximating sine functions 601-603 is defined using a different set of parameters a, b, c, and d, and approximates the RX signal sequence with a high correlation coefficient.

Thus, the parameters a, b, c, and d are calculated in order to determine a sine function that best approximates a measured RX signal sequence. One method for calculating the parameters c and d is based on minimizing Equation 6 below, according to the least squares method:

$$Q = \sum_{i=0}^{N-1} [a + b \cdot \sin(c \cdot i + d) - S_i]^2 \quad \text{(Equation 6)}$$

However, using trigonometric theory, c can be more easily determined as follows, in Equation 7:

$$c = \frac{2 \cdot \pi}{N - 1} \quad \text{(Equation 7)}$$

Figure 7:
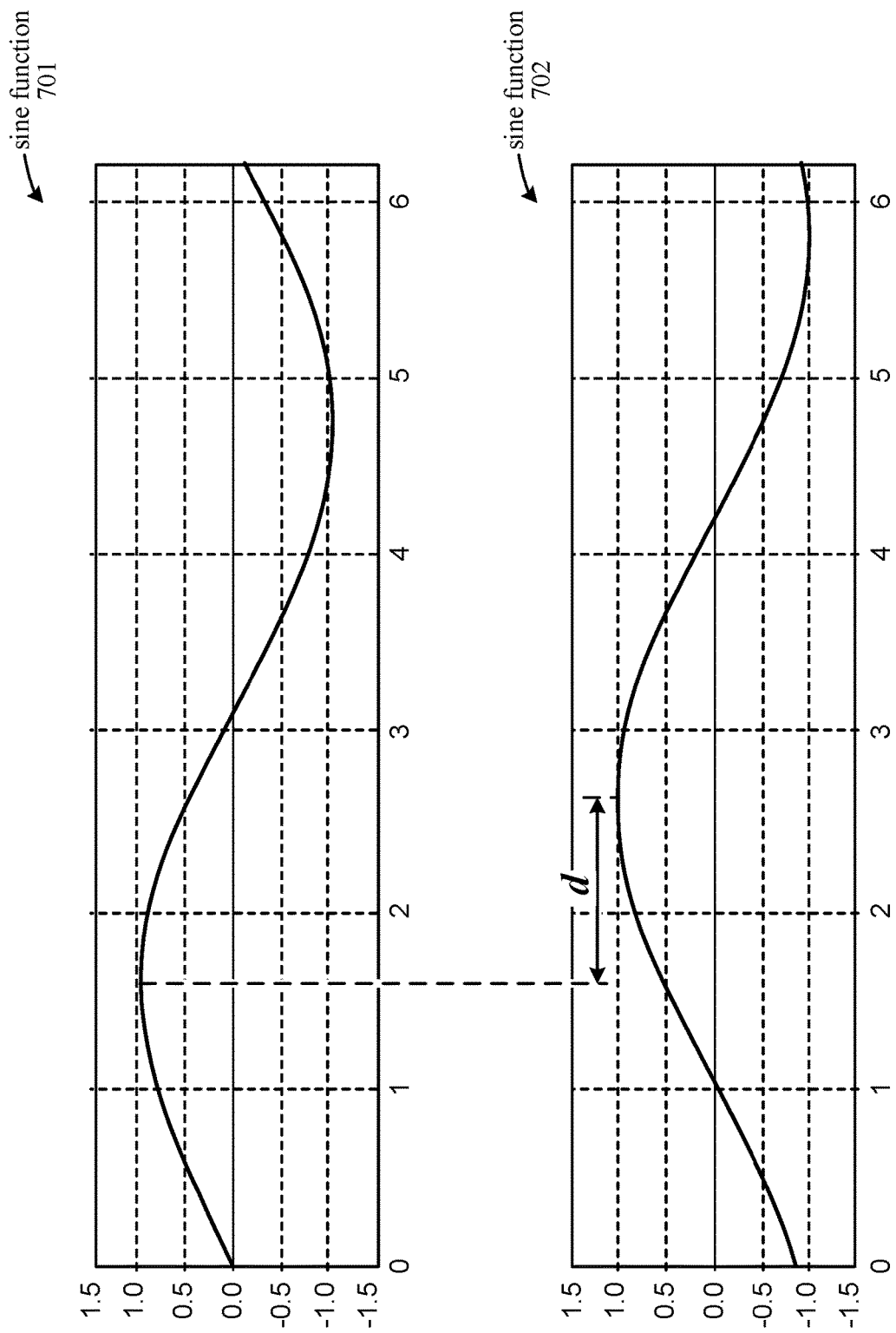
FIG. 7 illustrates displacement of a sine function, according to an embodiment.

In Equation 7, N represents the number of sensor electrodes, and $2 \times \pi$ is the period of the sine function. In one embodiment, the parameter d defines an amount by which the sine function is shifted along the x axis, as illustrated in FIG. 7. In FIG. 7, sine function 701 has a value of d that is equal to zero. Sine function 702 has a non-zero value of d; accordingly, features of the sine function 702 are shifted by the amount d relative to the original sine function 701. The parameter d is calculated according to Equation 8:

$$d = -\frac{2 \cdot \pi \cdot \left(idxMax - \frac{N-1}{4}\right)}{N-1} \quad \text{(Equation 8)}$$

In Equation 8, idxMax represents the index of the sensor electrode from which the highest magnitude signal is measured, and N represents the number of sensor electrodes. The parameter d represents the displacement of the hover input (i.e., the position of the object relative to the sensor electrodes in the array 103).

Based on Equations 7 and 8, the argument $\arg_i$ of the sine function is calculated as follows in Equations 9:

$$\arg_i = c \cdot i + d = \frac{2 \cdot \pi}{N-1} \cdot i - \frac{2 \cdot \pi \cdot \left(idxMax - \frac{N-1}{4}\right)}{N-1} \quad \text{(Equations 9)}$$

$$\text{Or: } \arg_i = \frac{\pi \cdot [4 \cdot (i - idxMax) + N - 1]}{2 \cdot (N-1)}$$

Equation 10 below follows from Equations 5 and 9:

$$y = a + b \cdot \sin(\arg_i) = a + b \cdot \sin\left(\frac{\pi \cdot [4 \cdot (i - idxMax) + N - 1]}{2 \cdot (N-1)}\right) \quad \text{(Equation 10)}$$

Parameters a and b are calculated by minimizing Q in Equation 11 as follows:

$$Q = \sum_{i=0}^{N-1} [a + b \cdot \sin(\arg_i) - S_i]^2 \Rightarrow \min \quad \text{(Equation 11)}$$

In Equation 11, $S_i$ is the measured response signal caused by the hover input from the sensor electrode having index i. Partial differentiation yields Equations 12 below:

$$\begin{cases} \frac{\partial Q}{\partial a} = 2 \cdot \sum_{i=0}^{N-1} [a + b \cdot \sin(\arg_i) - S_i] = 0 \\ \frac{\partial Q}{\partial b} = 2 \cdot \sum_{i=0}^{N-1} [a + b \cdot \sin(\arg_i) - S_i] \cdot \sin(\arg_i) = 0 \end{cases} \quad \text{(Equations 12)}$$

Equations 12 can be expressed as shown in Equations 13:

$$\begin{cases} N \cdot a + b \cdot \sum_{i=0}^{N-1} \sin(\arg_i) = \sum_{i=0}^{N-1} S_i \\ a \cdot \sum_{i=0}^{N-1} \sin(\arg_i) + b \cdot \sum_{i=0}^{N-1} [\sin(\arg_i)]^2 = \sum_{i=0}^{N-1} S_i \cdot \sin(\arg_i) \end{cases} \quad \text{(Equation 13)}$$

Equations 13 can be simplified by denoting variables sumSin, sumS, sumSinSin, and sumSsin as shown below in Equations 14:

$$sumSin = \sum_{i=0}^{N-1} \sin(\arg_i) \quad \text{(Equations 14)}$$

$$sumS = \sum_{i=0}^{N-1} S_i$$

$$sumSinSin = \sum_{i=0}^{N-1} [\sin(\arg_i)]^2$$

$$sumS\sin = \sum_{i=0}^{N-1} S_i \cdot \sin(\arg_i)$$

Equations 13 can thus be expressed as shown in Equations 15:

$$\begin{cases} N \cdot a + b \cdot sumSin = sumS \\ a \cdot sumSin + b \cdot sumSinSin = sumS\sin \end{cases} \quad \text{(Equation 15)}$$

Solving the first equation of Equations 15 for parameter a yields Equation 16:

$$a = \frac{sumS - b \cdot sumSin}{N} \quad \text{(Equation 16)}$$

Substituting Equation 16 into the second equation of Equations 15 yields Equation 17 below:

$$\frac{sumS - b \cdot sumSin}{N} \cdot sumSin + b \cdot sumSinSin = sumS\sin \quad \text{(Equation 17)}$$

Solving Equation 17 for the parameter b yields Equation 18:

$$b = \frac{N \cdot sumS\sin - sumS \cdot sumSin}{N \cdot sumSinSin - sumSin^2} \quad \text{(Equation 18)}$$

In one embodiment, the equations above can be used to calculate the parameters a, b, c, and d of a sine function that approximates the measured RX signal sequence. Notably, the correlation coefficient between the RX signal sequence and the approximating sine function can be calculated without calculating parameter a.

The sine function is calculated in the post processing block 222. Different approaches can be used to calculate the sine function in devices with limited computing resources. For example, the sine function can be computed using a Coordinate Rotation Digital Computer (CORDIC) calculation or alternatively, the Taylor series for the sine function, as expressed in Equation 19 below, in which arg is the input argument to the sine function:

$$\sin(\arg) = \arg - \frac{\arg^3}{3!} + \frac{\arg^5}{5!} - \frac{\arg^7}{7!} + \ldots + \frac{(-1)^{n-1}}{(2n-1)!} \arg^{2n-1} + \ldots \quad \text{(Equation 19)}$$

In one embodiment, the sine function is tabulated in a lookup table (LUT) 225, which stores a result of the sine function for each of a range of possible input arguments. Thus, calculation of the correlation coefficient in the post processing block 222 involves performing lookups in the LUT 225. Performing a table lookup is not an iterative calculation and thus can be performed with limited computing time and resources. Furthermore, the tabulation need not consume a large amount of memory. For a sine function, data stored in the LUT 225 for a first quarter of the period can be used to construct the remainder of the period. In one embodiment, the LUT 225 occupies no more than 65 bytes of memory.

Figure 8:
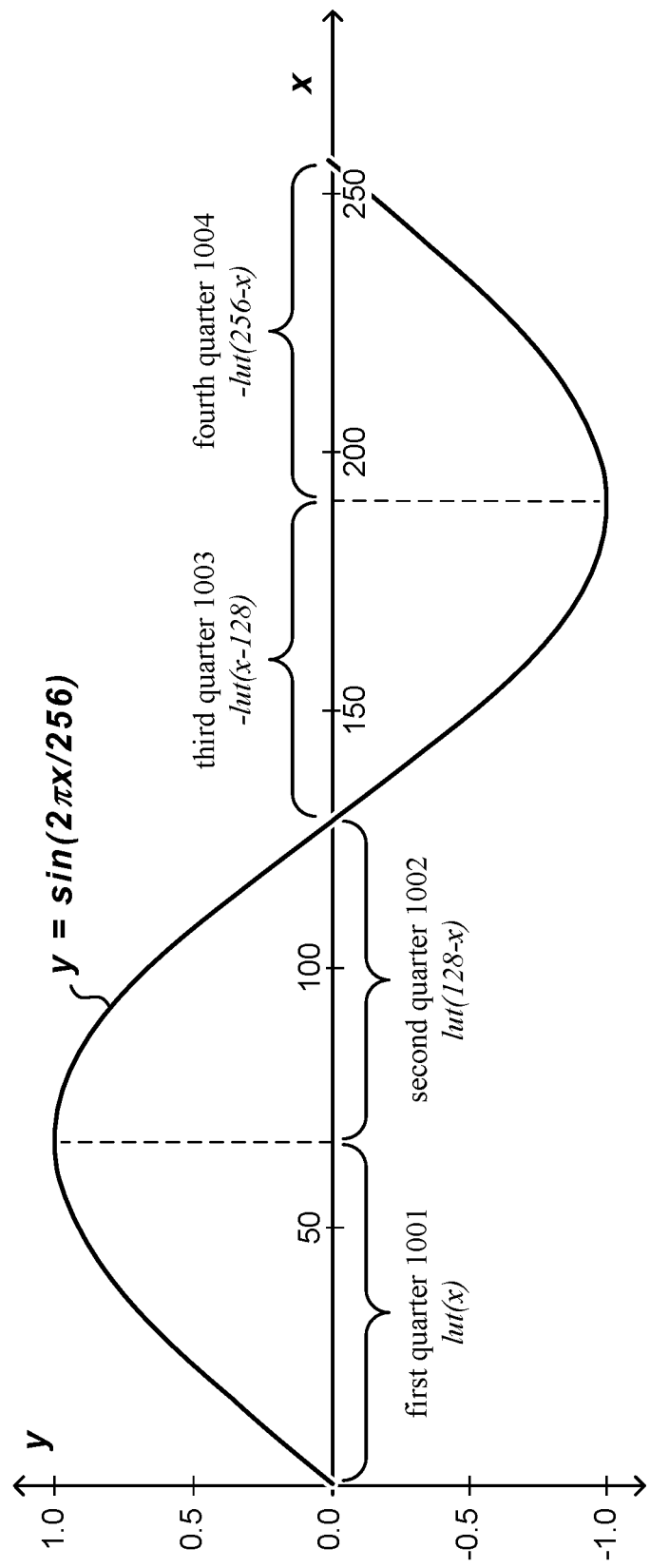
FIG. 8 illustrates division of a sine function period into quarters for referencing a lookup table, according to an embodiment.

FIG. 8 illustrates the division of a period of a sine function into four quarters to reduce the size of the LUT 225, according to an embodiment. In FIG. 8, the sine function y=sin(2 πx/256) has a period T that is equal to 256. Input arguments x that fall in the first quarter 1001 are looked up directly from the LUT 225 to determine the result of the sine function for the argument x. For input arguments x in the second quarter 1002, x is subtracted from 128 and the result is looked up in the LUT 225. For input arguments x in the third quarter 1003, 128 is subtracted from x and the result is looked up in the LUT 225 and negated. For input arguments x in the fourth quarter 1004, x is subtracted from 256 and the result is looked up in the LUT 225 and negated.

The input argument x is also limited to the range between 0 and 256, since the period of the sine function is T=256. In one embodiment, if x is greater than 256, a modulo operation (e.g., x mod 256) is performed to calculate an input argument within the acceptable range for lookup.

The input argument $arg_i$ for electrode index i is expressed in terms of i and idxMax in Equation 9 above. Equations 20 show the conversion of Equation 9 from a sine function with period $2\pi$ to the sine function with period T=256, by multiplying by the factor $256/2\pi$.

$$arg_i = \frac{256 \cdot \pi \cdot [4 \cdot (i - idxMax) + N - 1]}{2 \cdot \pi \cdot 2 \cdot (N-1)} \quad \text{(Equations 20)}$$

$$\text{Or: } arg_i = \frac{256 \cdot (i - idxMax)}{N-1} + 64$$

Once the correction of the period has been performed as shown in Equations 20, the resulting input argument $arg_i$ can be looked up in the LUT 225.

The post processing block 222 performs the sine function calculation when calculating the correlation coefficient between the measured sequence of RX signals and its approximating sine function, as defined by the parameters a, b, c, and d. To calculate the correlation coefficient, the average values avSigOriginal and avSigAppr for the measured RX signal sequence and the approximating sine function, respectively, are calculated as shown in Equations 21 and 22 below.

$$avSigOriginal = \frac{\sum_{i=0}^{N-1} S_i}{N} \quad \text{(Equation 21)}$$

$$avSigAppr = \frac{\sum_{i=0}^{N-1} [a + b \cdot \sin(arg_i)]}{N} = a + \frac{b \cdot \sum_{i=0}^{N-1} \sin(arg_i)}{N} \quad \text{(Equation 22)}$$

Equation 23 is true for the entire period of the sine function.

$$\sum_{i=0}^{N-1} \sin(arg_i) = 0 \quad \text{(Equation 23)}$$

Therefore, Equation 22 can be reduced to show that avSigAppr is equal to a.

The squared correlation coefficient is calculated as shown in Equation 24.

$$corrCoeff = \frac{256 \cdot \left( \sum_{i=0}^{N-1} (S_i - avSigOriginal) \cdot (Sappr_i - avSigAppr) \right)^2}{\sum_{i=0}^{N-1} (S_i - avSigOriginal)^2 \cdot \sum_{i=0}^{N-1} (Sappr_i - avSigAppr)^2} \quad \text{(Equation 24)}$$

Equation 24 is expressed more simply by denoting $deltaAppr_i$ and $deltaOriginal_i$ as follows in Equation 25:

$$\begin{cases} deltaAppr_i = Sappr_i - avSigAppr \\ \qquad = a + b \cdot \sin(arg_i) - a = b \cdot \sin(arg_i) \\ deltaOriginal_i = S_i - avSigOriginal \end{cases} \quad \text{(Equations 25)}$$

As shown in Equations 25, the correlation coefficient can be calculated without calculating the parameter a. Combining Equation 24 with Equations 25 yields an expression for calculating the correlation coefficient, as shown in Equation 26.

$$corrCoeff = \frac{256 \cdot \left( \sum_{i=0}^{N-1} deltaOriginal_i \cdot deltaAppr_i \right)^2}{\sum_{i=0}^{N-1} deltaOriginal_i^2 \cdot \sum_{i=0}^{N-1} deltaAppr_i^2} \quad \text{(Equation 26)}$$

The approximating sine curve is adjusted by moving the coordinate of the largest signal to the left and to the right from the index of the sensor with the largest signal (i.e., idxMax) until the correlation coefficient value corrCoeff, as calculated according to Equation 26, is maximized.

In one embodiment, the post processing block 222 detects a hover input due to the presence of an object near the sensor electrodes based on comparing the maximized correlation coefficient with a predetermined correlation threshold. If the correlation coefficient exceeds the correlation threshold, then the measured RX signal sequence is sufficiently close to the approximating sine function and the post processing block 222 detects a hover input. The correlation threshold is a tunable parameter in the range between 0 and 255. In one embodiment, the correlation threshold is 75, so that a hover input is detected if the correlation coefficient is greater than or equal to 75.

Figure 9A:
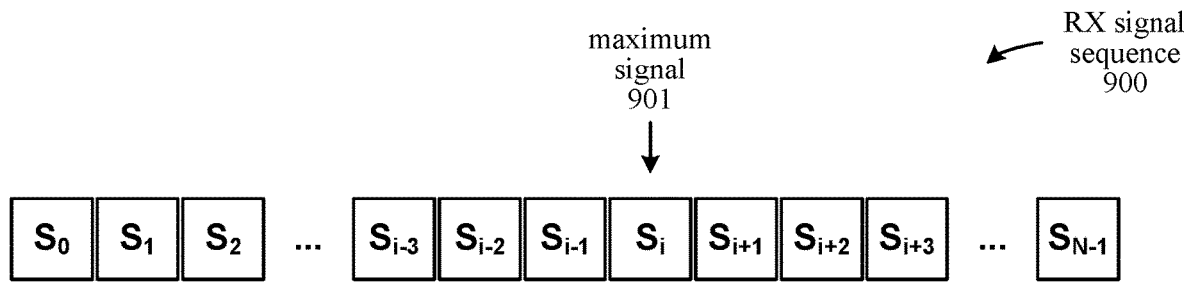
FIGS. 9A and 9B illustrate approximation of a subset of signals surrounding a maximum measured value with a parabola, according to an embodiment.

In one embodiment, a TX excitation signal pattern that does not have a zero sum can be similarly analyzed using a least squares approximation instead of deconvolution. In one embodiment, a parabola is used to approximate the measured sequence of RX signals. According to this approach, a vertex is calculated for the approximating parabola function based on a subset of the measured RX signals surrounding a maximum RX signal value. FIG. 9 illustrates a portion of an RX signal sequence 900 in which the maximum signal 901 has a value of $S_i$, according to an embodiment. The subset of measured RX signals surrounding the maximum 901 include signals $S_{i-3}$ to $S_{i+3}$. With reference to Equation 27 below, the approximating parabola function is defined by a quadratic curve, with $Sappr_{i-j}$ representing the value of the parabola function corresponding to a sensor electrode that is j electrodes away from the electrode i at which the maximum signal was measured.

$$Sappr_{i-j} = a + b \cdot j + c \cdot j^2 \qquad \text{(Equation 27)}$$

The extremum of the parabola is calculated by setting the derivative of the quadratic function to zero, as shown in Equations 28 below.

$$y = a + b \cdot x_0 + c \cdot x_0^2 \qquad \text{(Equations 28)}$$
$$\frac{dy}{dx_0} = b + 2 \cdot c \cdot x_0 = 0$$
$$x_0 = -\frac{b}{2 \cdot c}$$

Equation 29 shows the function to be minimized according to the least squares approximation.

$$Q = \sum_{j=-3}^{3} [a + b \cdot j + c \cdot j^2 - S_{i-j}]^2 \Rightarrow \min \qquad \text{(Equation 29)}$$

Partial differentiation of Equation 29 yields Equations 30.

$$\begin{cases} \frac{\partial Q}{\partial a} = 2 \cdot \sum_{j=-3}^{3} [a + b \cdot j + c \cdot j^2 - S_{i-j}]^2 = 0 \\ \frac{\partial Q}{\partial b} = 2 \cdot \sum_{j=-3}^{3} [a + b \cdot j + c \cdot j^2 - S_{i-j}] \cdot j = 0 \\ \frac{\partial Q}{\partial c} = 2 \cdot \sum_{j=-3}^{3} [a + b \cdot j + c \cdot j^2 - S_{i-j}] \cdot j^2 = 0 \end{cases} \qquad \text{(Equations 30)}$$

Combining Equations 28 and Equations 30 yields Equation 31 below.

$$x_0 = -\frac{3 \cdot \sum_{j=-3}^{3} S_{i-j} \cdot j}{2 \cdot \left( \sum_{j=-3}^{3} S_{i-j} \cdot j^2 - 4 \cdot \sum_{j=-3}^{3} S_{i-j} \right)} \qquad \text{(Equation 31)}$$

Figure 9B:
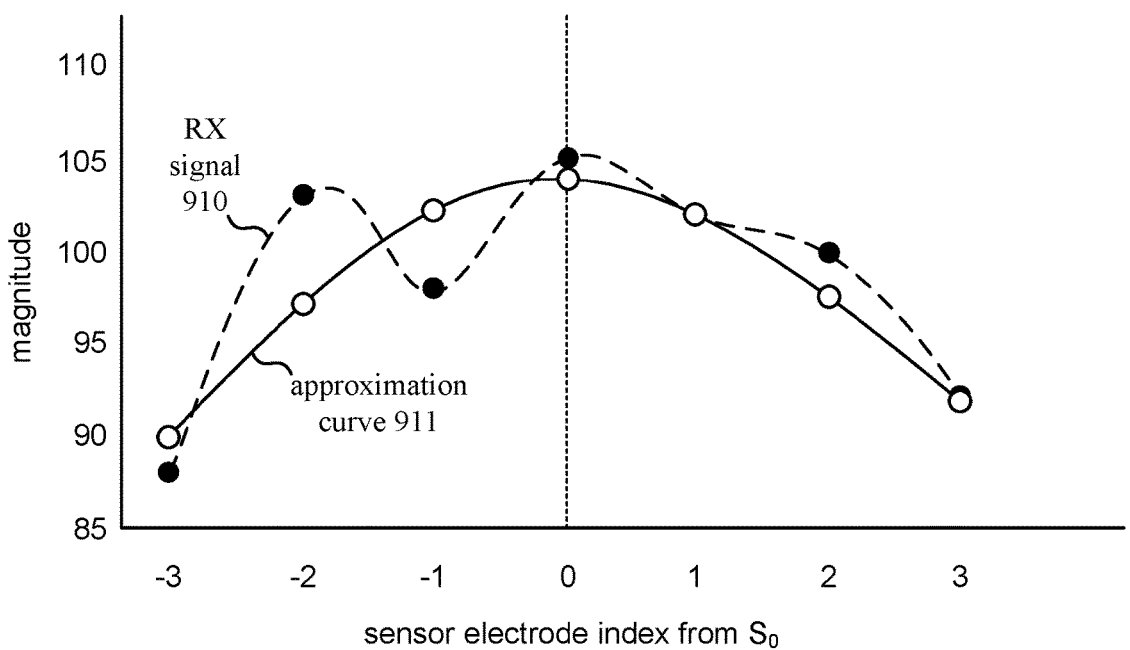

FIG. 9B illustrates a graph of the resulting approximation curve 911 along with the measured RX signal 910. The vertical axis represents the magnitude of the RX signal 910 and the approximation curve 911, while the bottom axis of the graph represents the indexes of the corresponding sensor electrodes. As illustrated, seven electrodes around the highest measured value are used; however, greater noise immunity for detecting hover inputs is achieved by involving a greater number of sensor electrode measurements in the detection process.

In one embodiment, a reciprocal quadratic curve is used as a predetermined function for approximating a measured sequence of RX signals. The approximation using the reciprocal quadratic curve utilizes a larger number of the available RX measurements, thus increasing noise immunity in the hover detection result, since error caused by noise is averaged over a larger number of sensor electrodes. The reciprocal quadratic curve is defined in Equation 32 below.

$$Sappr_i = \frac{1}{a + b \cdot i + c \cdot i^2} \qquad \text{(Equation 32)}$$

In Equation 32, $Sappr_i$ is the magnitude of the function result, i is the index of the sensor electrode for which the function result is calculated. Parameters a, b, and c correspond to a version of the curve that best approximates the measured sequence of RX signals. A correlation coefficient between the RX signal sequence and its approximating reciprocal quadratic curve is calculated according to Equation 38, derived as shown in Equations 33-38 as follows. For the reciprocal quadratic curve, a vertex $x_0$ is equal to $-b/2c$. Accordingly, Equation 32 can be expressed in terms of the vertex $x_0$ as shown in Equations 33.

$$Sappr_i = \frac{1}{a + b \cdot i + c \cdot i^2} \qquad \text{(Equations 33)}$$
$$Sappr_i = \frac{1}{a + c \cdot i \cdot (i - 2 \cdot x_0)}$$

In Equations 33, $Sappr_i$ is the magnitude of the approximating function corresponding to sensor electrode index i. The magnitude of the signal at the vertex $x_0$ is set to a variable $S_p$ in Equations 34.

$$S_p = \frac{1}{a + c \cdot p \cdot (p - 2 \cdot x_0)} \qquad \text{(Equations 34)}$$
$$a = \frac{1}{S_p} - c \cdot p \cdot (p - 2 \cdot x_0)$$

In Equations 34, $S_p$ is the value of the peak magnitude, while $p$ is the index corresponding to the electrode where the peak magnitude is located. The function to be minimized, according to the least squares approximation process is expressed below in Equation 35.

$$Q = \sum_{i=0}^{N-1} \left[ c \cdot (i \cdot (i - 2 \cdot x_0) - p \cdot (p - 2 \cdot x_0)) + \frac{1}{S_p} - \frac{1}{S_i} \right]^2 \Rightarrow \min \qquad \text{(Equation 35)}$$

Partial differentiation of Equation 35 yields Equations 36 below.

$$\frac{\partial Q}{\partial c} = 2 \cdot \sum_{i=0}^{N-1} \left[ c \cdot (i \cdot (i - 2 \cdot x_0) - p \cdot (p - 2 \cdot x_0)) + \frac{1}{S_p} - \frac{1}{S_i} \right] \cdot \qquad \text{(Equations 36)}$$
$$(i \cdot (i - 2 \cdot x_0) - p \cdot (p - 2 \cdot x_0)) = 0$$
$$c = \frac{\sum_{i=0}^{N-1} \frac{(S_p - S_i) \cdot (i \cdot (i - 2 \cdot x_0) - p \cdot (p - 2 \cdot x_0))}{S_i}}{S_p \cdot \sum_{i=0}^{N-1} (i \cdot (i - 2 \cdot x_0) - p \cdot (p - 2 \cdot x_0))^2}$$

Equations 36 are simplified by denoting variables A and B as shown below in Equations 37.

$$\begin{cases} A = \sum_{i=0}^{N-1} \dfrac{(S_p \cdot S_i) \cdot (i \cdot (i - 2 \cdot x_0) - p \cdot (p - 2 \cdot x_0))}{S_i} \\ B = \sum_{i=0}^{N-1} (i \cdot (i - 2 \cdot x_0) - p \cdot (p - 2 \cdot x_0))^2 \end{cases}$$ (Equations 37)

Equations 38 result from substituting A and B into Equations 36.

$$Sappr_i = \dfrac{1}{a - 2 \cdot c \cdot x_0 \cdot i + c \cdot i^2} = \dfrac{S_p \cdot B}{B + A \cdot (i \cdot (i - 2 \cdot x_0) - p \cdot (p - 2 \cdot x_0))}$$ (Equations 38)

The RX signals are normalized, and a squared correlation coefficient is calculated between the normalized RX signals and their approximation by the reciprocal quadratic curve according to Equations 39 below.

$$avSigNorm = \dfrac{\sum_{i=0}^{N-1} Snorm_i}{N}$$

$$avSigAppr = \dfrac{\sum_{i=0}^{N-1} Sappr_i}{N}$$

$$corrCoeff = \dfrac{256 \cdot \left( \sum \dfrac{(Snorm_i - avSigNorm) \cdot}{(Sappr_i - avSigApp)} \right)^2}{\sum_{i=0}^{N-1} (Snorm_i - avSigNorm)^2 \cdot \sum_{i=0}^{N-1} (Sappr_i - avSigAppr)^2}$$ (Equations 39)

A hover input is detected if the correlation coefficient corrCoeff is greater than a correlation threshold. The correlation threshold is a tunable parameter in the range between 0 and 255. In one embodiment, the correlation threshold has a value of 125.

Figure 10A:
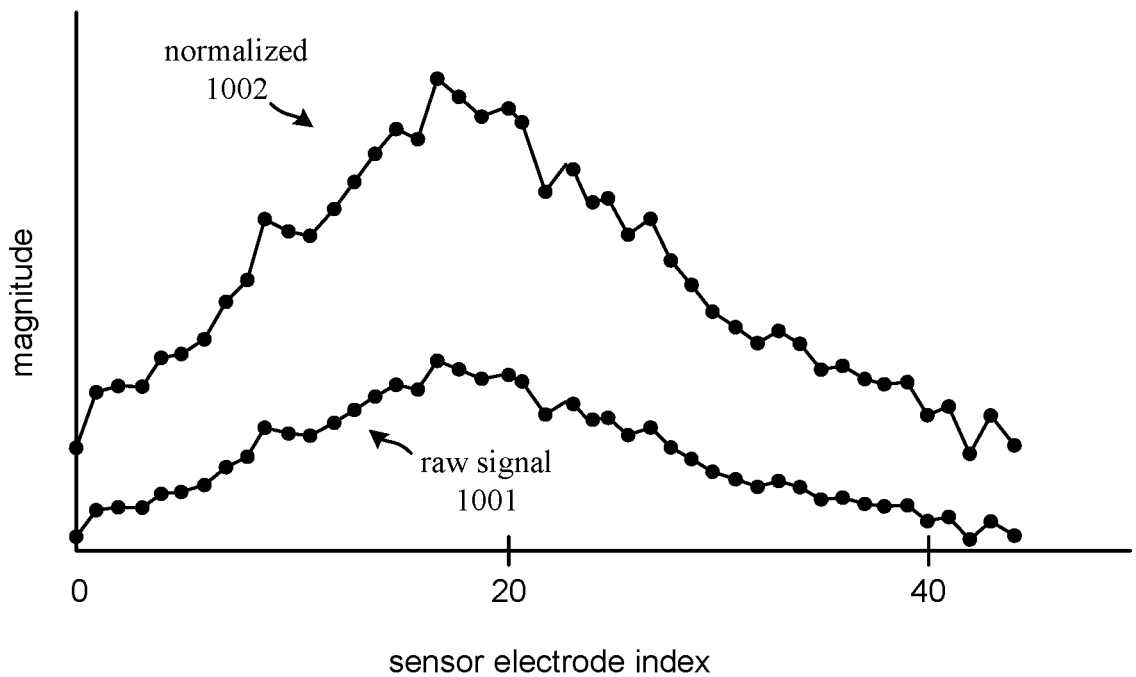
FIGS. 10A-11 illustrate approximations of different measured signal sequences by reciprocal quadratic curves, according to an embodiment.
Figure 10A:
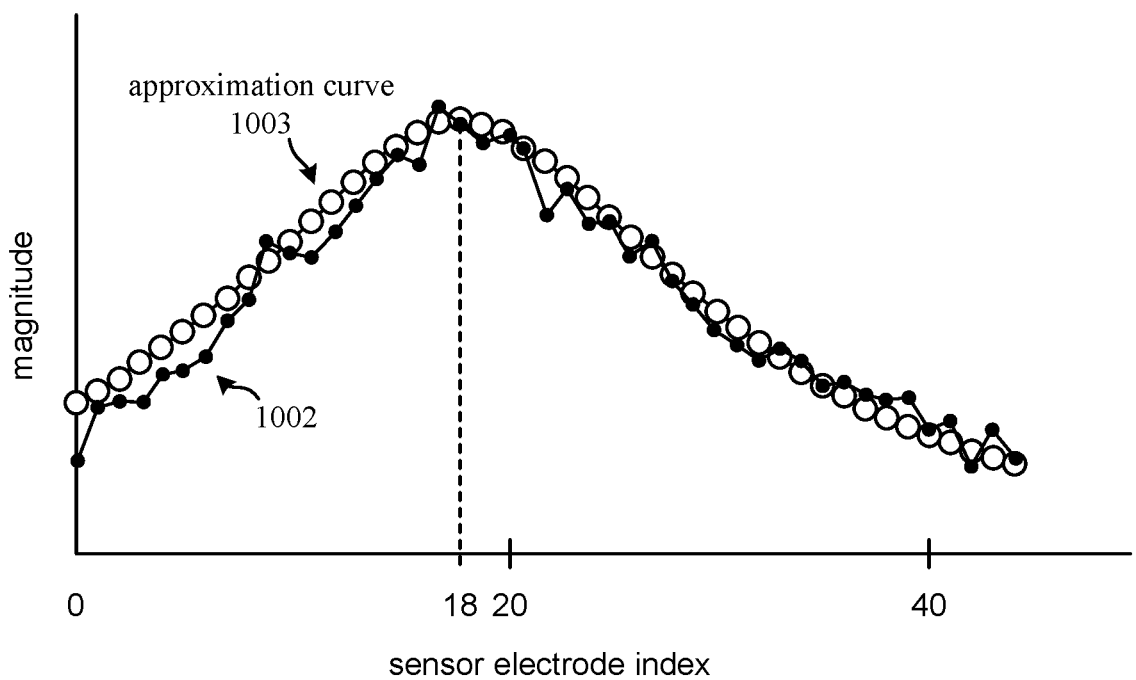

FIG. 10A illustrates a reciprocal quadratic curve 1003 approximating a sequence of RX signals 1001 resulting from a hover input at sensor electrode 18, according to an embodiment. The raw RX signal sequence 1001 as measured from the sensor electrodes 0-44 is normalized to generate a normalized sequence of RX signals 1002. The normalized signal sequence 1002 is approximated by curve 1003. The vertex of the curve 1003 corresponds to the location of the hover input at sensor electrode 18. In FIG. 10A, the correlation coefficient is 246; thus, the presence of the hover input is detected because the correlation coefficient is greater than the correlation threshold of 175.

Figure 10B:
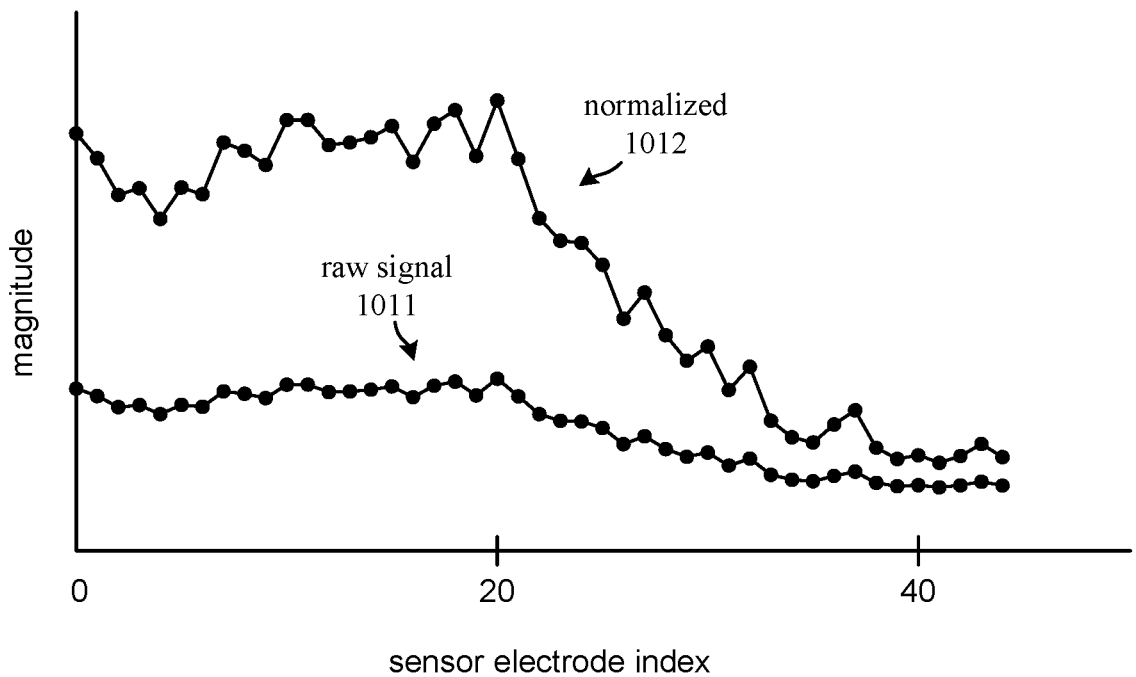
Figure 10B:
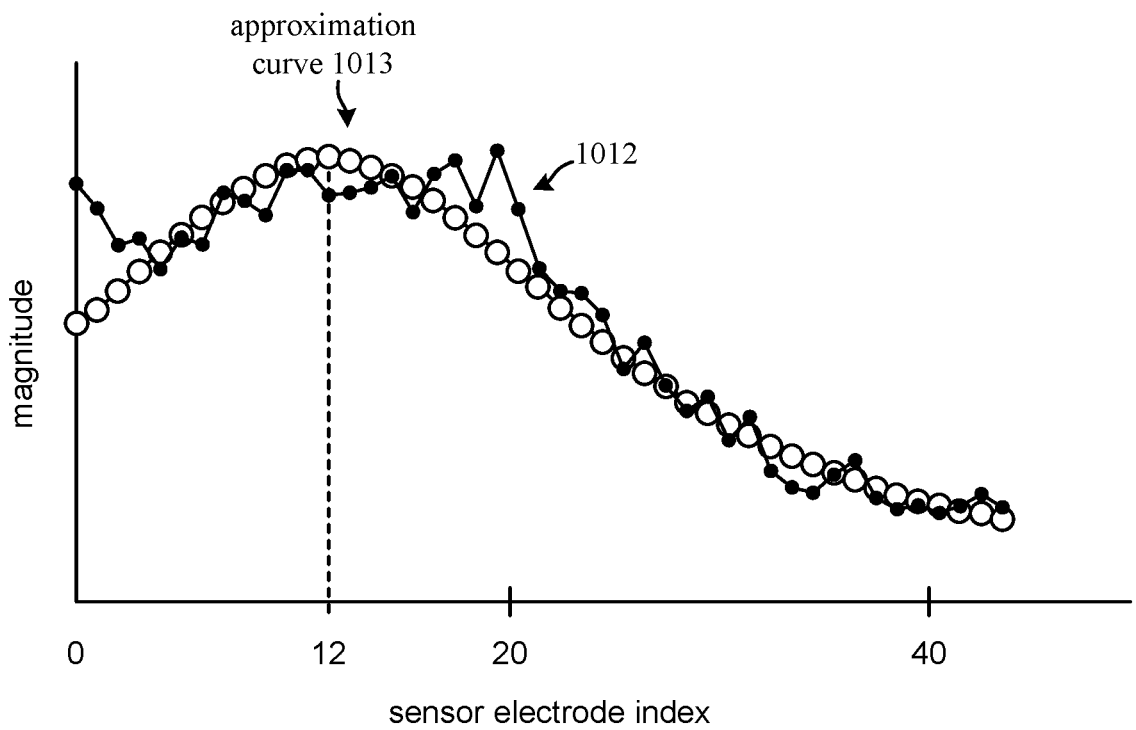

FIG. 10B similarly illustrates a reciprocal quadratic curve 1013 approximating a sequence of RX signals 1011 resulting from a hover input at sensor electrode 12, according to an embodiment. The raw RX signal sequence 1011 as measured from the sensor electrodes 0-44 is normalized to generate a normalized sequence of RX signals 1012. The normalized signal sequence 1012 is approximated by curve 1013. The vertex of the curve 1013 corresponds to the location of the hover input at sensor electrode 12. In FIG. 10B, the correlation coefficient is 234; thus, the presence of the hover input is detected because the correlation coefficient is greater than the correlation threshold of 175.

Figure 11:
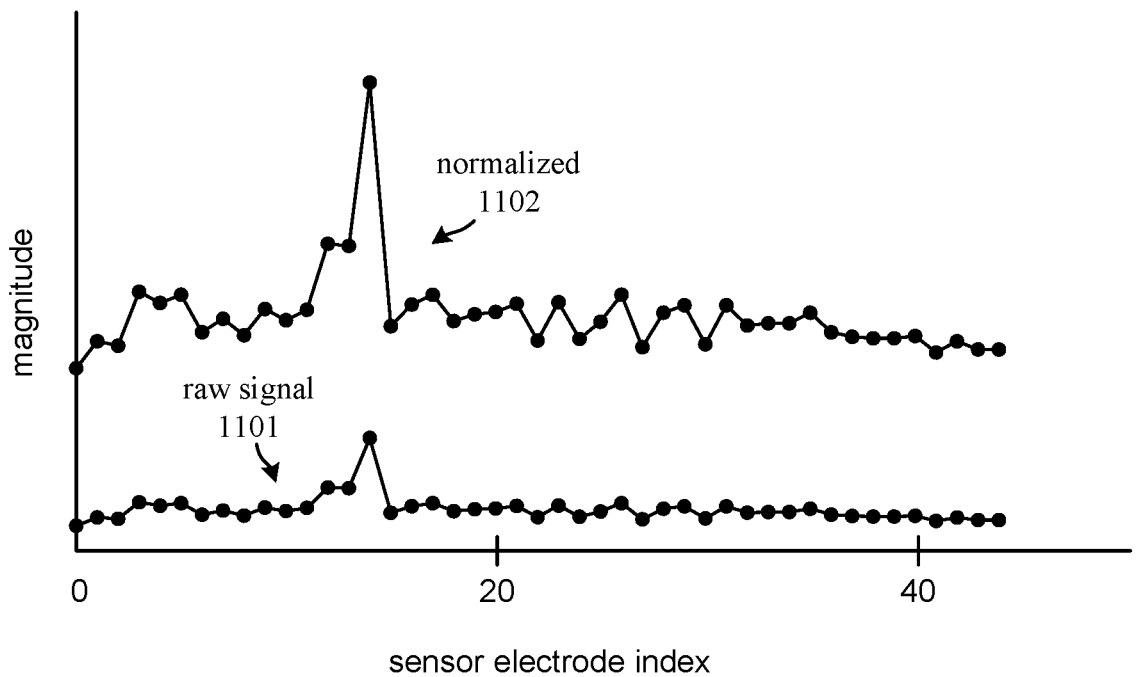
Figure 11:
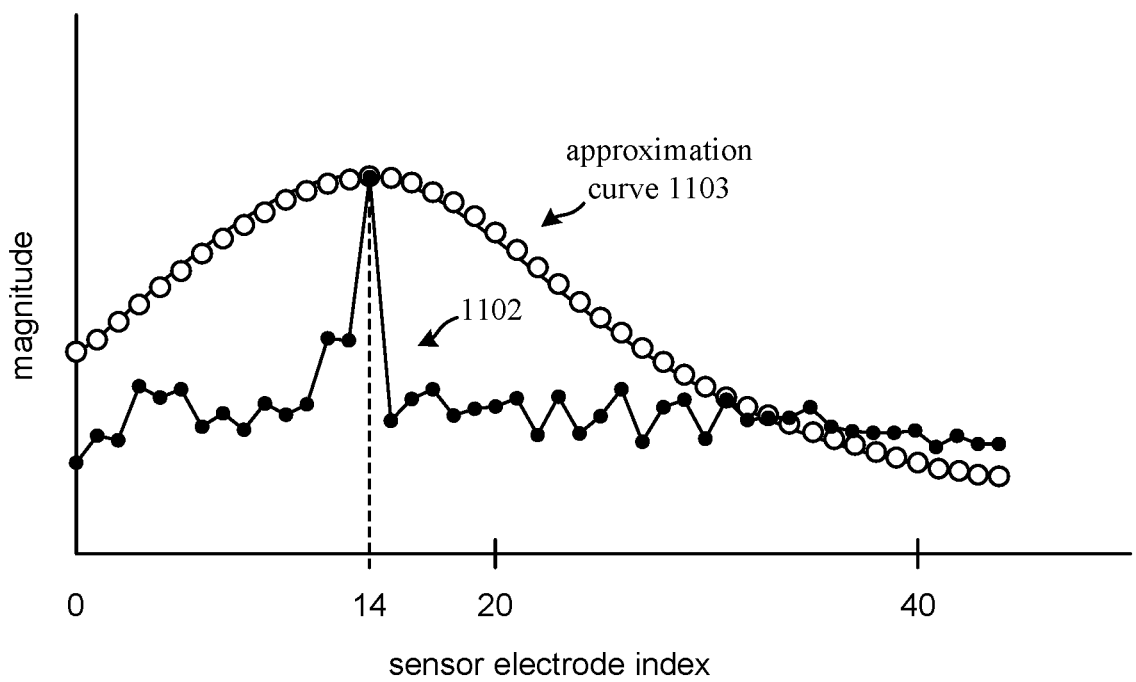

FIG. 11 illustrates a reciprocal quadratic curve 1103 approximating a sequence of RX signals 1101 resulting from heating the sensor array, rather than from a hover input. The raw RX signal sequence 1101 as measured from the sensor electrodes 0-44 is normalized to generate a normalized sequence of RX signals 1102. The normalized signal sequence 1102 is approximated by curve 1103. The vertex of the curve 1103 corresponds to the location of the highest signal magnitude at sensor electrode 14. In FIG. 11, the correlation coefficient is 60; thus, the presence of the hover input is not detected because the correlation coefficient is less than the correlation threshold of 175.

Figure 12:
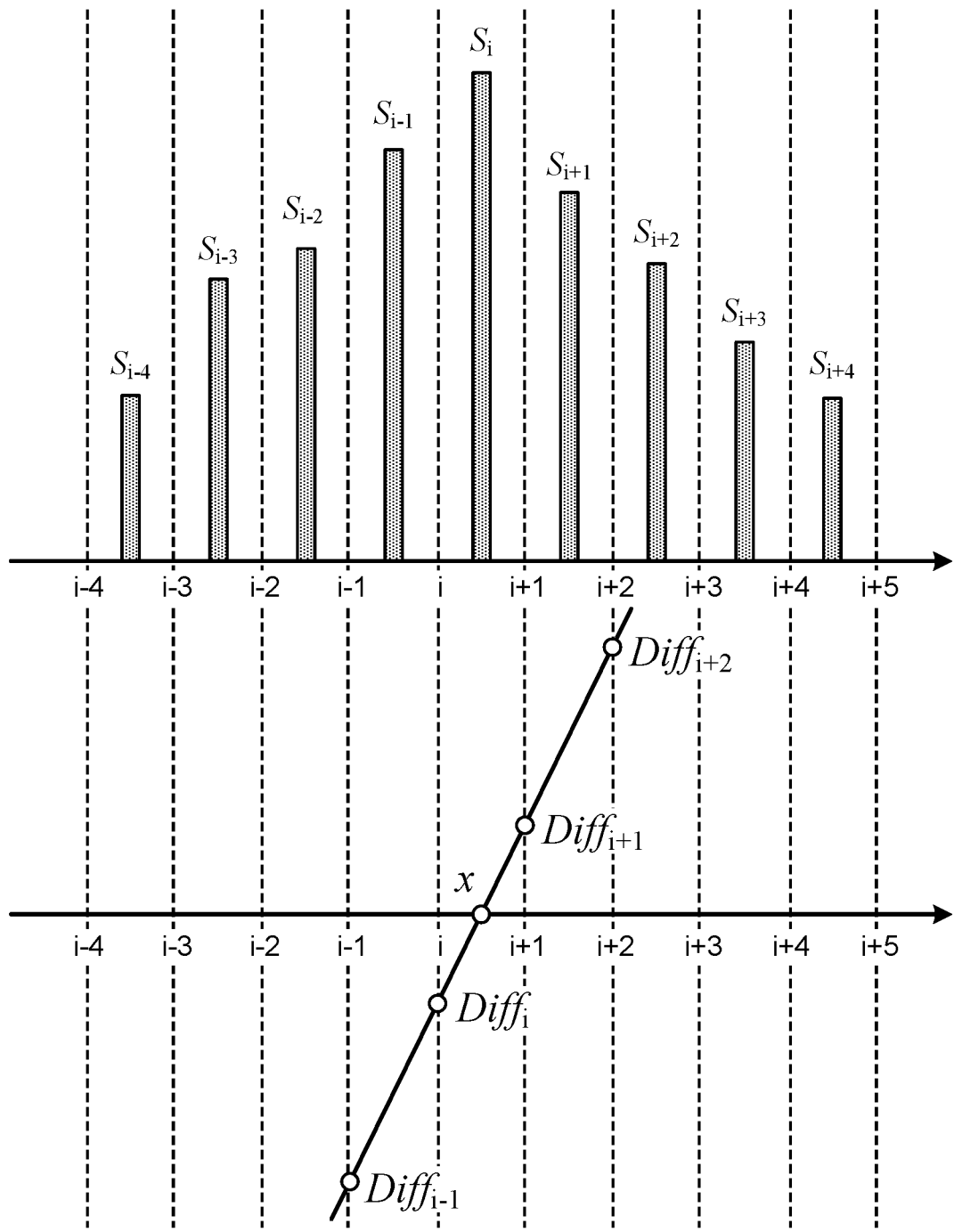
FIG. 12 illustrates the calculation of a hover input position based on differentials calculated from a measured signal sequence, according to an embodiment.

In one embodiment, a subset of nine signals surrounding the local maximum signal in the RX signal sequence are approximated by a cubic curve in order to determine the location of the hover input. According to this approach, values of the differences $Diff_{i-1}$, $Diff_i$, $Diff_{i+1}$, and $Diff_{i+2}$ of the RX signal sequence (corresponding to sensor electrodes $i-1$, $i$, $i+1$, and $i+2$, respectively) are linearly related with the indexes of their corresponding sensor electrodes. FIG. 12 illustrates this linear relationship by graphing the differential values $Diff_{i-1}$, $Diff_i$, $Diff_{i+1}$, and $Diff_{i+2}$ relative to the sensor electrode indexes, according to an embodiment. The top portion of FIG. 12 shows the signal magnitudes $S_{i-4}$ to $S_{i+4}$ for the sensor electrodes. The intercept of this line with the x axis indicates the hover position.

The intercept x is calculated according to Equation 40, where N is the number of sensor electrodes and ResX is the resolution of the sensor array along the length of the X (horizontal) axis in pixels.

$$x = \dfrac{ResX}{Nx} \cdot \left( i - \dfrac{Diff_{i-1}}{Diff_i - Diff_{i-1}} \right)$$ (Equation 40)

The coefficients of the approximating cubic curve are determined according to Equation 41.

$$S_{i-j} = a - b \cdot j - c \cdot j^2$$ (Equation 41)

Accordingly, the function to be minimized for the least squares approximation is shown in Equation 42.

$$Q = \sum_{j=-4}^{4} [S_{i-j} - a - b \cdot j - c \cdot j^2]^2 \Rightarrow \min$$ (Equation 42)

Partial differentiation of Equation 42 yields Equations 43.

$$\begin{cases} \dfrac{\partial Q}{\partial a} = -2 \cdot \sum_{j=-4}^{4} [S_{i-j} - a - b \cdot j - c \cdot j^2] = 0 \\ \dfrac{\partial Q}{\partial b} = -2 \cdot \sum_{j=-4}^{4} [S_{i-j} - a - b \cdot j - c \cdot j^2] \cdot j = 0 \\ \dfrac{\partial Q}{\partial c} = -2 \cdot \sum_{j=-4}^{4} [S_{i-j} - a - b \cdot j - c \cdot j^2] \cdot j^2 = 0 \end{cases}$$ (Equations 43)

Equation 40 can thus be expressed as shown in Equation 44.

$$x = \frac{\text{Re}\,sX}{256 \cdot Nx} \cdot \left(256 \cdot i + 128 - \frac{9856 \cdot \sum_{j=-4}^{4} S_{i-j} \cdot j}{5 \cdot \left(3 \cdot \sum_{j=-4}^{4} S_{i-j} \cdot j^2 - 20 \cdot \sum_{j=-4}^{4} S_{i-j}\right)}\right)$$ (Equation 44)

The value calculated for x according to the above equations provides a coordinate for the detected hover input, in terms of the sensor electrode indexes.

Figure 13B:
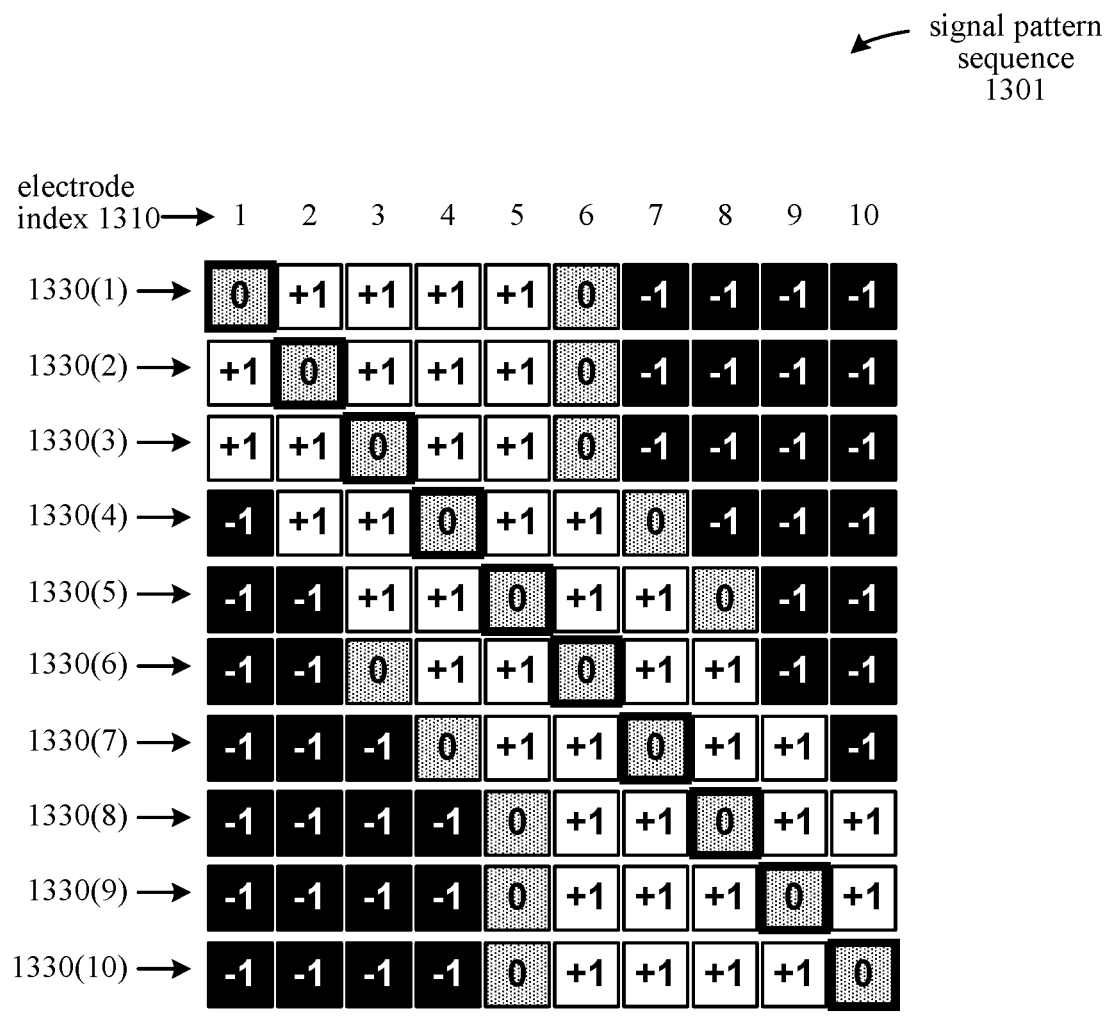
Figure 13C:

In one embodiment, noise immunity from nearby sources (e.g., LCD common mode noise) is improved by reducing the number of sensor electrodes from which RX signals are being measured. This happens because the charge injected into the sensing channel from the LCD panel is proportional to the number of electrodes being sensed by the channel at same time, or in other words, proportional to the coupling capacitance between the equivalent RX sensor electrode and LCD panel. FIGS. 13A-13C illustrate sequences of excitation signal patterns according to an embodiment, in which TX excitation signals are applied to the sensor electrodes in a non-circular manner and the RX signal is measured for each pattern from a single sensor electrode via a single RX sensing channel.

With reference to FIG. 13A, each of the excitation signal patterns 1320 (including signal patterns 1320(1)-1320(10)) in the sequence 1300 applies a positive phase excitation signal to sensor electrodes surrounding and including the sensor electrode from which the RX signal is measured (indicated with bold outlines). For example, in pattern 1320(5), the positive phase excitation signals are applied to electrodes 3-7. Each of the signal patterns in the sequence 1300 is a zero-sum pattern; thus, the complementary negative phase excitation signals are applied to the remaining electrodes 1-2 and 8-10 in signal pattern 1320(5). A decrease in the magnitude of the measured RX signal due to fewer sensor electrodes being measured is compensated by an associated decrease in external noise (e.g., from an LCD display).

FIG. 13B illustrates a sequence 1301 of signal patterns 1330, including patterns 1330(1)-1330(10). For each of the excitation signal patterns 1330, no excitation signal (as indicated by '0') is applied to some of the sensor electrodes, including the sensor electrode from which the RX signal is measured. In each pattern, the positive phase excitation signals are applied to the sensor electrodes surrounding the sensed electrode. Each of the patterns 1330 is also a zero-sum signal pattern.

FIG. 13C illustrates a signal pattern sequence 1302 in which, for each of the excitation signal patterns 1340, no excitation signal is applied to a larger number of sensor electrodes, including the sensor electrode from which the RX signal is measured. Each of the patterns 1340 is also a zero-sum signal pattern.

Figure 14A:
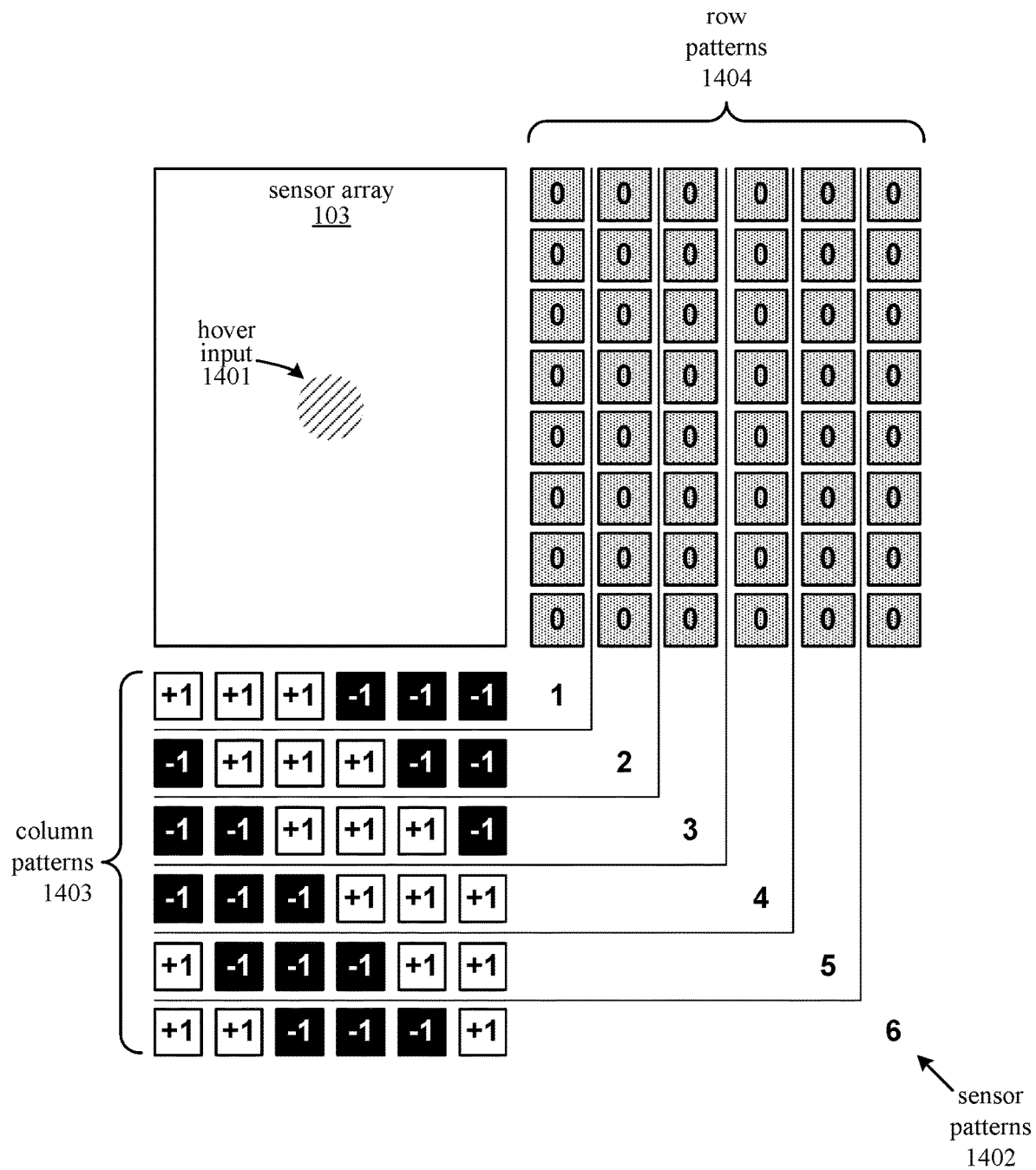
FIGS. 14A-14C illustrate sequences of excitation signal patterns that are applied to both row and column sensor electrodes, according to an embodiment.
Figure 14B:
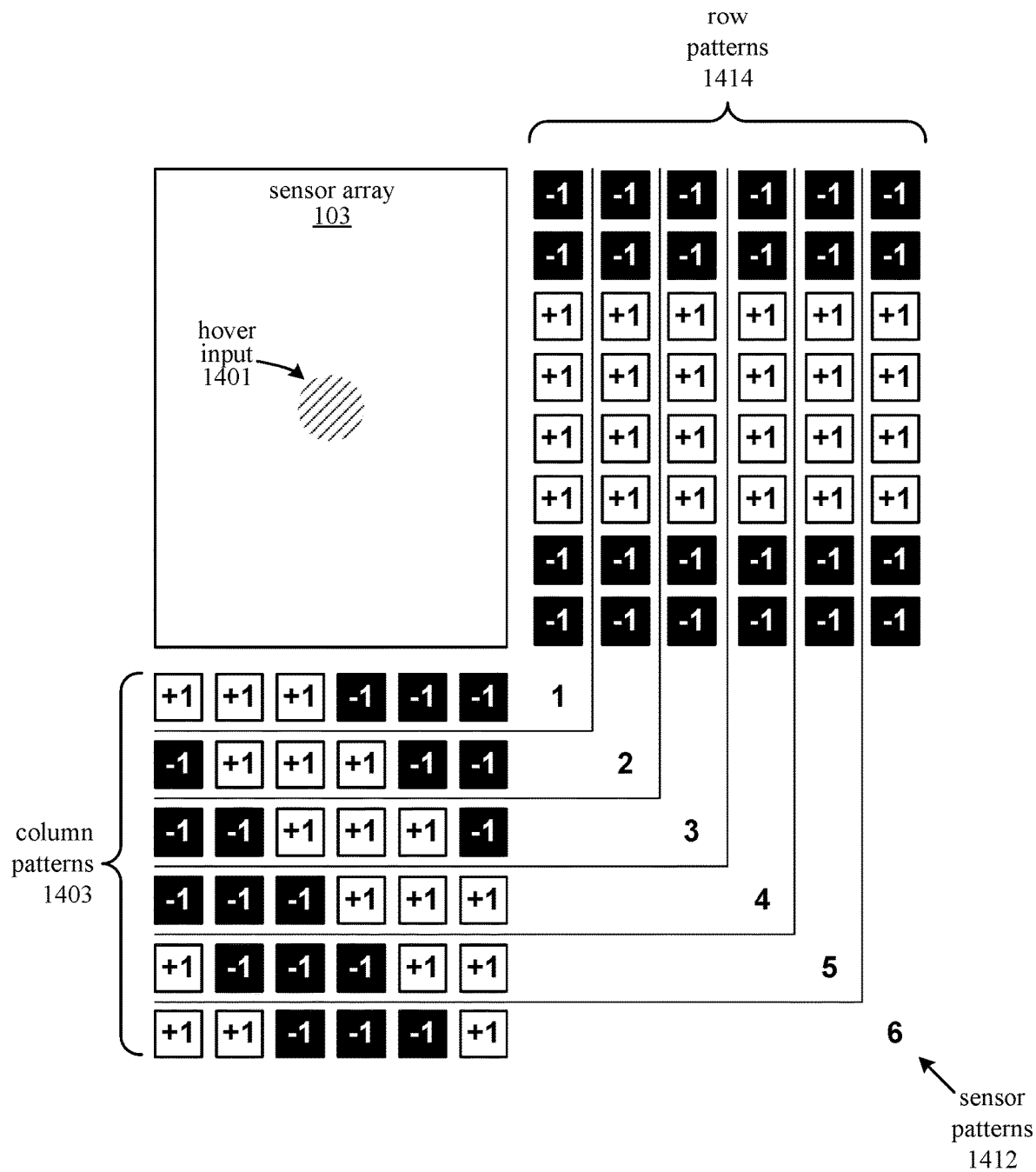
Figure 14C:
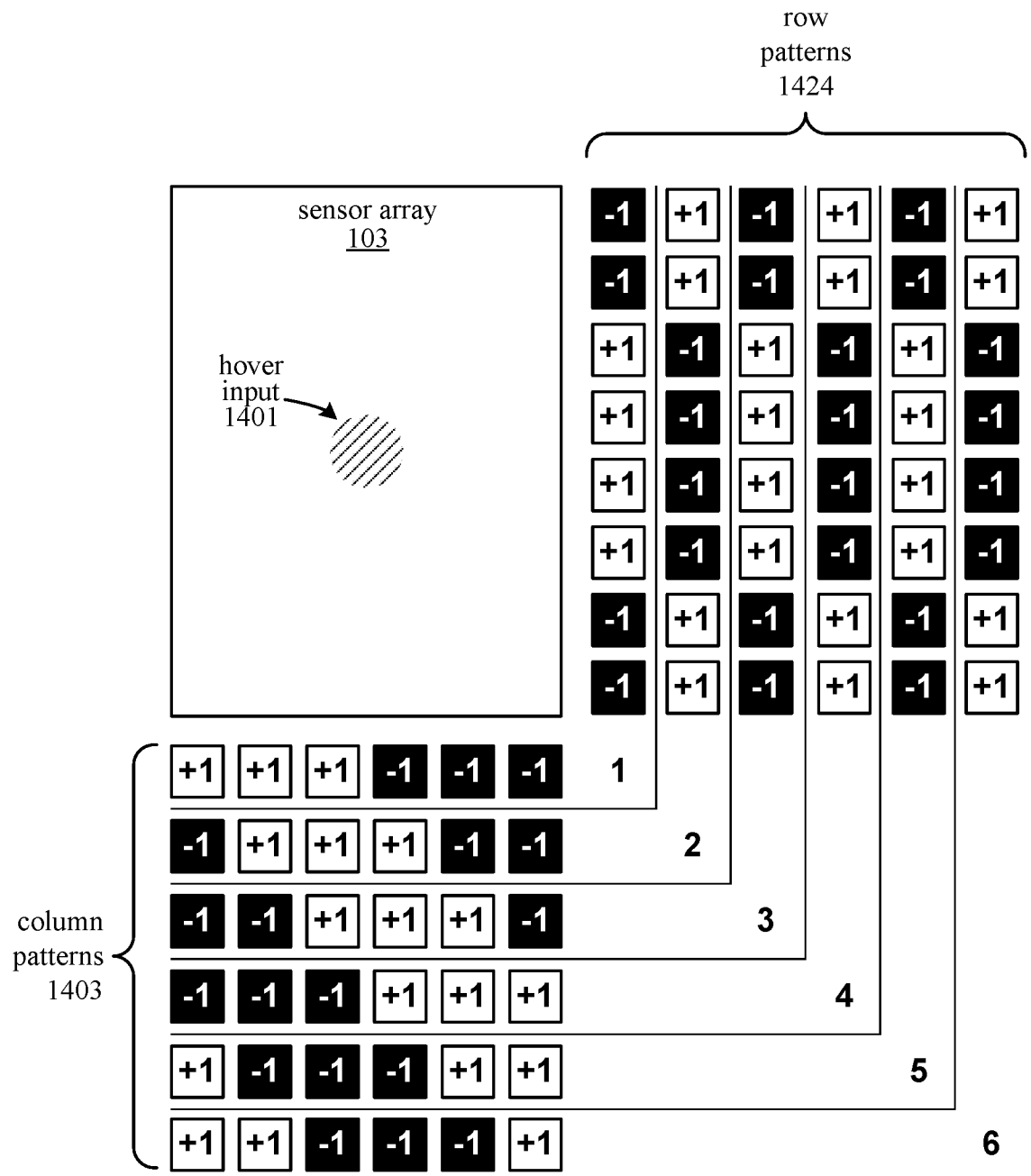

FIGS. 14A-14C illustrate an approach for increasing the measurable RX signal during sensing of a hover input, according to an embodiment. FIG. 14A illustrates a sequence of excitation patterns 1402 for detecting a hover input 1401 at the sensor array 103 as previously described, in which the column sensor electrodes are excited by a sequence of column excitation patterns 1403 that are circularly rotated zero-sum patterns. For each of the column patterns 1403, no excitation signal is applied to the row sensor electrodes. Accordingly, the row excitation patterns 1404 are all zero for each of the sensor patterns 1402.

If the location of the hover input 1401 along the vertical axis is known (e.g., if the row sensor electrodes were previously sensed), the measurable RX signal can be increased by applying positive phase excitation signals to a subset of the row sensor electrodes nearest to the hover input 1401 while applying negative phase excitation signals to the remaining row sensor electrodes. FIG. 14B illustrates this approach, according to an embodiment. A sequence of six sensor patterns 1412 is applied to the sensor array 103. For each of the column excitation signal patterns 1403, one of the row excitation signal patterns 1414 is applied to the row sensor electrodes based on a previously determined location of the hover input 1401. Each of the row excitation signal patterns 1414 is a zero sum pattern and applies a positive phase excitation signal to the four row sensor electrodes nearest to the hover input 1401, while a complementary negative phase excitation signal is applied to the remaining four row sensor electrodes.

This measurement procedure increases the baseline of the measured RX signals, but does not increase the dynamic range of the RX signals. In one embodiment, the magnitude of the measured RX signal for each of the sensor patterns 1412 is increased by approximately 175 fF, while the dynamic range of the RX signals (i.e., the difference between the lowest and highest RX signals) remains the same (approximately 150 fF). A similar effect occurs in the opposite direction (i.e., the baseline is decreased) when the phase polarity of the TX excitation signals are switched (i.e., positive phase excitation signals are switched with negative phase excitation signals).

FIG. 14C illustrates an embodiment in which positive and negative phase signals are alternated in the sequence of signal patterns 1424 applied to the row sensor electrodes. The phase polarities are alternated between successive patterns in the sequence 1412. In alternative embodiments, the phase polarities are alternated after every second pattern, third pattern, etc. The alternation of phase polarities for signal patterns applied the row sensor electrodes increases the dynamic range of the measured RX signal sequence without increasing the baseline. In one embodiment, the dynamic range is increased to approximately 500 fF.

Figure 15:
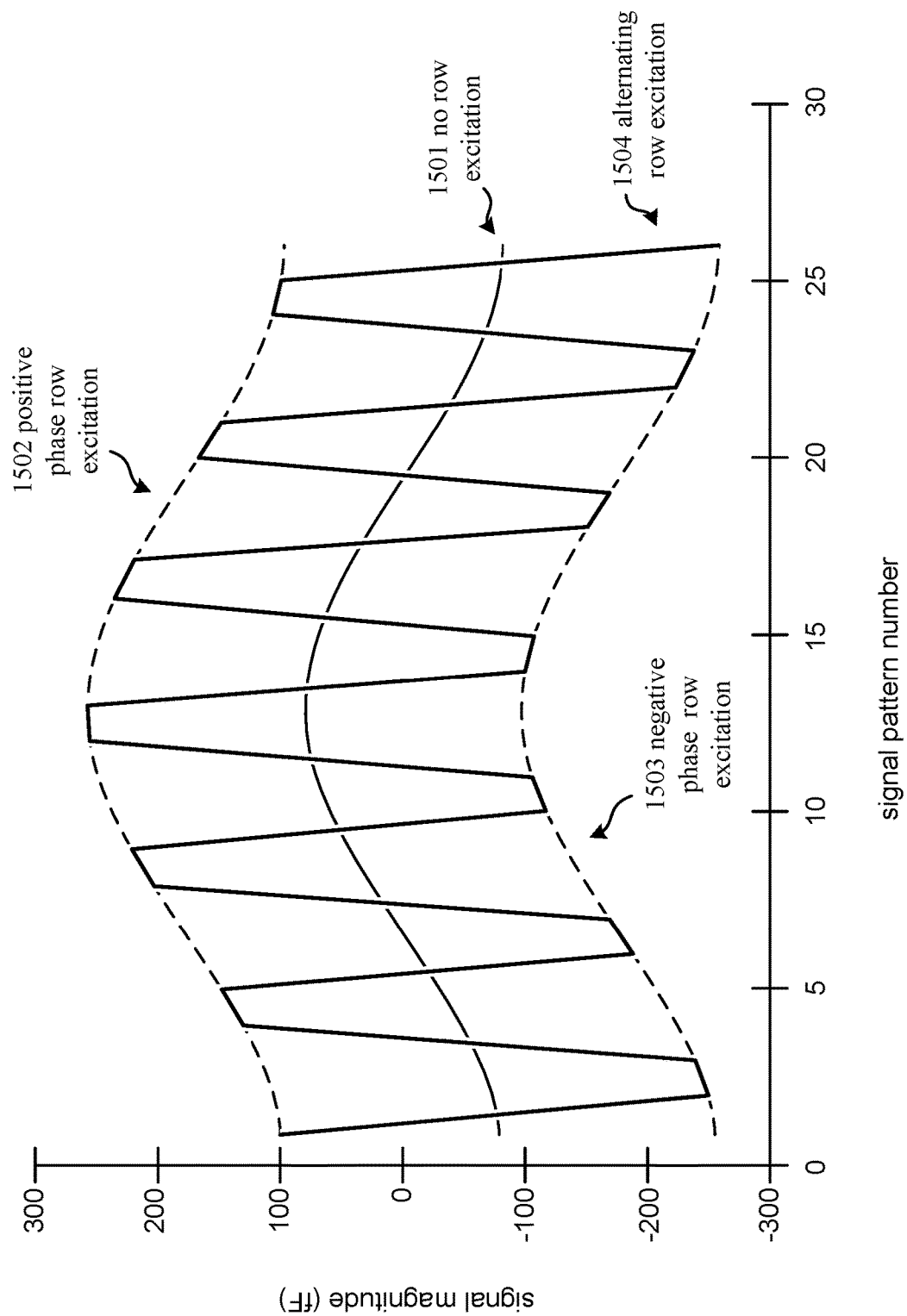
FIG. 15 illustrates measured signal sequences resulting from excitation of both row and column sensor electrodes using different excitation patterns, according to an embodiment.

FIG. 15 illustrates a graph of RX signal sequences for the different measurement approaches, according to an embodiment. RX signal sequence 1501 results from measurement of a hover input 1401 when no excitation signal is applied to the row sensor electrodes. RX signal sequences 1502 and 1503 represent the cases where positive phase excitation signals and negative phase excitation signals, respectively, are applied to the row sensor electrodes nearest the hover input 1401. RX signal sequence 1504 is generated when alternating positive and negative phase excitation signals are applied to the row sensor electrodes nearest the hover input 1401, with the alternation occurring every second pattern. This type of drive method can be referred to as "correlated double sampling", and reduces drift in the receive channels.

Figure 16:
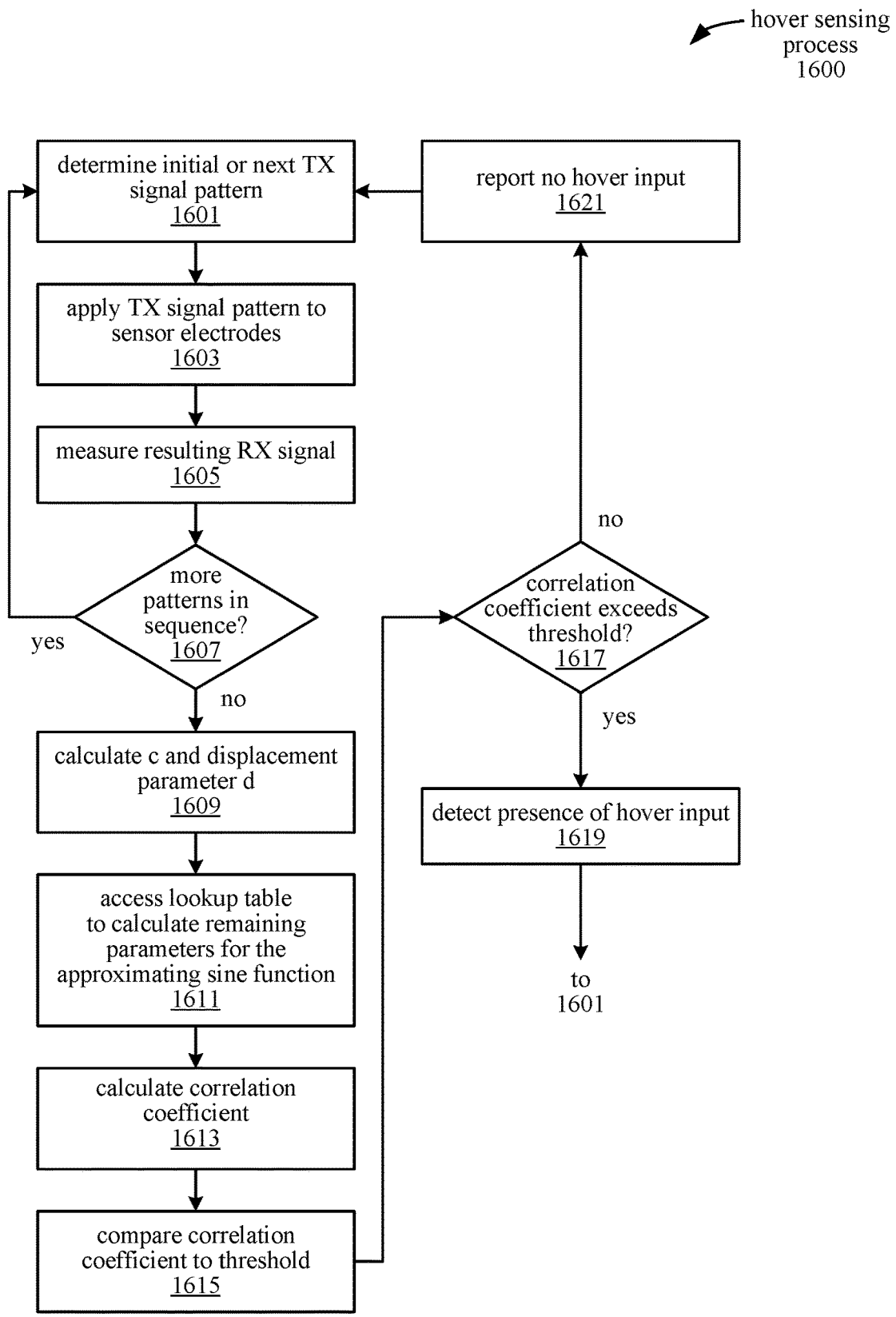
FIG. 16 illustrates a process for detecting the presence and location of a hover input, according to an embodiment.

FIG. 16 is a flow diagram illustrating a process 1600 for sensing a hover input at a capacitive sensor array 103, according to an embodiment. The process 1600 is performed by components in the processing device 102.

At block 1601, the sequencer 223 determines an initial TX signal pattern in a sequence of TX signal patterns for applying the sensor array 103. At block 1603, the TX generator 215 applies the initial TX signal pattern the set of TX electrodes in the sensor array 103 by, for each sensor electrode in a set of sensor electrodes (e.g., the column sensor electrodes in the sensor array 103), applying either a positive phase excitation signal or a negative phase excitation signal according to the TX signal pattern. The negative phase excitation signal is complementary to the positive phase excitation signal, and the positive and negative phase excitation signals are applied to sensor electrodes that are contiguous in a circular sequence of the sensor electrodes.

In one embodiment where zero-sum excitation patterns are used, the positive phase excitation signal is applied to half of the sensor electrodes in the set and the negative phase excitation signal is applied to the remaining half. Accordingly, the magnitude of a sum of the excitation signals applied to the sensor electrodes is reduced to less than the magnitude of any of the excitation signals applied to an individual one of the sensor electrodes, and ideally approaches zero. In alternative embodiments where a non-zero sum excitation pattern is used, the excitation of the sensor electrodes generates at least as much emission as a single sensor electrode to which an excitation signal is applied. At block 1605, the resulting RX signal induced from the application of the initial TX signal pattern is measured by the RX channel 224 in the charge to code converter 216.

At block 1607, if there are any TX signal patterns in the sequence that have not yet been applied to the sensor electrodes, then the process 1600 returns to block 1601. At block 1601, the sequencer circuit 223 determines the next TX signal pattern in the sequence of TX signal patterns based on a circular rotation of the initial TX signal pattern. In one embodiment, the current pattern of positive and negative phase excitation signals is circularly shifted by one sensor electrode to generate the next TX signal pattern in the sequence. Thus, for each TX signal pattern, the excitation signal applied to each sensor electrode corresponds to the excitation signal that was applied to a preceding (i.e., lower-indexed) sensor electrode in a circular sequence of the set of sensor electrodes during application of the preceding TX excitation signal pattern, where the preceding TX excitation signal pattern is the pattern in the sequence that was most recently applied prior to the current signal pattern. In alternative embodiments, the current pattern is shifted by more than one electrode.

Blocks 1601-1607 are repeated in a loop so that each of the TX signal patterns in the sequence is applied in order to the set of sensor electrodes and an RX signal response is measured for each TX signal pattern. The measured sequence of RX signals is stored in memory as a vector 211. At block 1607, if all of the TX signal patterns have been applied, the post processing block 222 calculates the correlation coefficient between the measured sequence of RX signals and a least squares approximation of the RX signal sequence by a predetermined function, such as a sine function, as provided at blocks 1609-1613.

At block 1609, some parameters of the approximating sine function are calculated; for example, parameters c and d are calculated using Equations 7 and 8. Parameter d represents a displacement that indicates a position of the hovering object relative to the sensor electrodes, and is calculated based on a highest magnitude signal in the measured sequence of RX signals.

At block 1611, the post processing block 222 determines remaining parameters for the sine function using a least squares calculation for approximating the sequence of RX signals. In one embodiment, the LUT 225 stores a result of the sine function for each of a number of possible input arguments. The post processing block 222 accesses the LUT 225 when calculating the remaining parameters (e.g., parameter b according to Equation 18).

At block 1613, the post processing block 222 calculates the correlation coefficient between the measured RX signal sequence and its approximation by the sine function having the calculated parameters. In one embodiment, the approximating sine curve is adjusted by shifting the sine curve relative to the sensor electrode indexes until the correlation coefficient, as calculated according to Equation 26, is maximized.

At block 1615, the post processing block 222 compares the correlation coefficient with a predetermined correlation threshold. At block 1617, if the correlation coefficient does not exceed the correlation threshold, then no hover input is detected, and the post processing block 222 reports at block 1621 that no hover input is present. From block 1621, the process 1600 returns to block 1601 to restart the detection process. At block 1617, if the correlation coefficient exceeds the correlation threshold, the process 1600 continues at block 1619. At block 1619, the presence of a valid hover input is detected. From block 1619, the presence of the detected hover input and its location (as indicated by the displacement parameter d) are transmitted to the host device 101, which performs some action (e.g., updating a cursor on the display 104, highlighting or selecting a menu item, etc.). The process 1600 returns to block 1601 to resume applying the TX excitation signal patterns to the sensor electrodes for the next measurement cycle, starting again from the initial TX excitation signal pattern in the sequence. The process 1600 thus repeats blocks 1601-1619 continuously to detect the presence of hover inputs and their locations over time.

Figure 17:
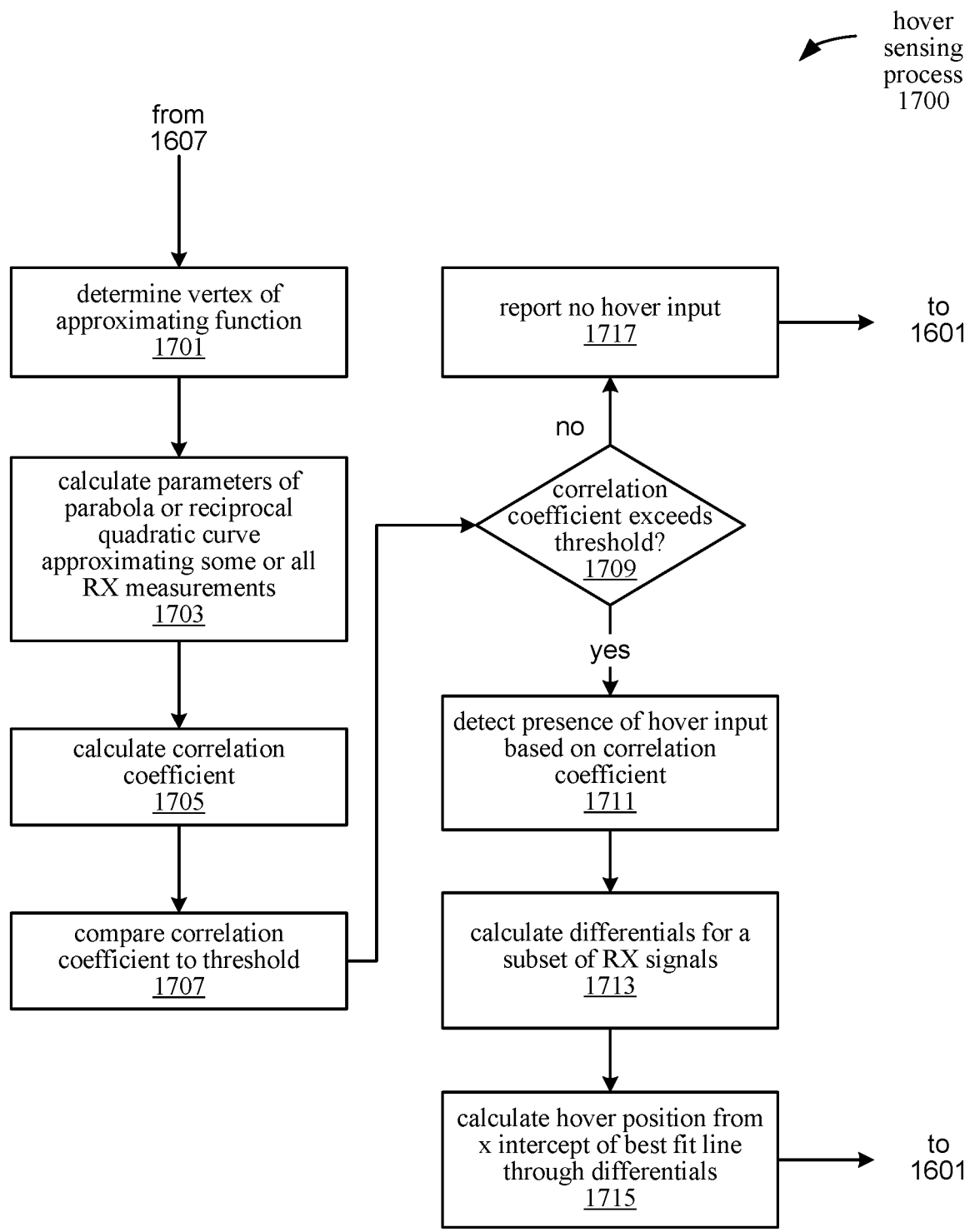
FIG. 17 illustrates a process for detecting the presence and location of a hover input, according to an embodiment.

FIG. 17 is a flow diagram illustrating a process 1700 for detecting a hover input based on a measured sequence of RX signals, according to an embodiment, which uses a non-zero sum scan sequence and a deconvolution procedure. In process 1700, a parabola or reciprocal quadratic function is used for the least squares approximation instead of a sine function. Process 1700 is performed by components in the processing device 102, including the post processing block 222. From block 1607 in process 1600, the process 1700 begins at block 1701. At this time, an RX signal has been measured for each of the TX excitation signal patterns in the sequence of TX excitation patterns.

At block 1701, the post processing block 222 determines the vertex of the approximating function (i.e., the parabola or reciprocal quadratic curve). The vertex of the approximating function is set equal to the measured RX signal having the highest magnitude. From block 1701, the process 1601 continues at block 1703.

At block 1703, the post processing block 222 normalizes the measured RX signal sequence and approximates a portion of the normalized RX signal sequence (e.g., seven RX signals nearest the highest magnitude RX signal) using the parabola with its vertex set as provided at block 1701. Alternatively, all of the available RX signals in the normalized sequence are approximated using the reciprocal quadratic curve with its vertex set as provided at block 1701.

At block 1705, a correlation coefficient is calculated that indicates a degree of correlation between the normalized RX signal (scaled down to a global peak value) sequence and the simulated hover profile approximating function, having its peak at a vertex point calculated by according to the parabola function. At block 1707, the correlation coefficient is compared with a predetermined correlation threshold. At block 1709, if the correlation coefficient does not exceed the threshold, then no hover input is detected. The absence of any hover input is reported at block 1717. The process 1700 returns to block 1601 to resume applying the sequence of TX excitation patterns to the sensor electrodes.

At block 1709, if the correlation coefficient exceeds the predetermined correlation threshold, the post processing block 222 detects a valid hover input, as provided at block 1711. In one embodiment, the location of the hover input relative to the sensor electrodes is determined according to blocks 1713 and 1715. At block 1713, a set of differentials is calculated for a subset of the RX signals nearest to the highest magnitude RX signal. At block 1715, the hover position is calculated from the x-axis intercept of a best fit line calculated for the differentials. From block 1715, the presence of the hover input and its location are communicated with the host device 101, which performs some action based on the presence of the hover input and/or its location. The process 1700 returns to block 1601 and resumes applying TX signal patterns to the sensor electrodes for the next measurement cycle.

In the foregoing embodiments, various modifications can be made; for example, signals described as being asserted with a high voltage may instead be asserted with a low voltage, or specified components can be replaced with other components having similar functionality. As described herein, conductive electrodes that are "electrically connected" or "electrically coupled" may be coupled such that a relatively low resistance conductive path exists between the conductive electrodes. Quantities, dimensions, or other values described as "substantially" equal may be nominally equal but need not be exactly equal (with variations due to manufacturing tolerances, environmental conditions, quantization or rounding error, and/or other factors), or may be sufficiently close to equal for achieving an intended effect or benefit.

Embodiments described herein include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the claimed subject matter has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A capacitance sensing device, comprising:
    a transmit (TX) generator configured to generate a sequence of receive (RX) signals by applying each TX signal pattern in a sequence of TX signal patterns to a set of sensor electrodes, the set of sensor electrodes comprising all of the sensor electrodes coupled to the transmit generator, wherein for each TX signal pattern in the sequence of TX signal patterns, the TX generator is configured to apply excitation signals to the set of sensor electrodes by, for each subset of a plurality of subsets each including three or more contiguous sensor electrodes of the set of sensor electrodes, applying the same one of a first excitation signal and a second excitation signal to each of the three or more contiguous sensor electrodes in the subset, wherein a magnitude of a sum of the excitation signals applied to the set of sensor electrodes is less than a magnitude of any one of the excitation signals applied to the set of sensor electrodes, and wherein the plurality of subsets comprises at least half of the sensor electrodes in the set of sensor electrodes;
    a sequencer circuit coupled with the TX generator and configured to, for each TX signal pattern in the sequence of TX signal patterns, determine a next subsequent TX signal pattern in the sequence based on a circular rotation of the TX signal pattern; and
    a processing block coupled with the TX generator and configured to detect a presence of an object proximate to the set of sensor electrodes based on a measure of correlation between the sequence of RX signals and a predetermined function.

2. The capacitance sensing device of claim 1, wherein for each TX signal pattern in the sequence of TX signal patterns, for each sensor electrode in the set of sensor electrodes, an excitation signal applied to the sensor electrode corresponds to an excitation signal applied to a preceding sensor electrode in a circular sequence of the set of sensor electrodes during application of a preceding TX signal pattern in the sequence of TX signal patterns.

3. The capacitance sensing device of claim 1, wherein
    the second excitation signal is complementary to the first excitation signal; and
    the sum of excitation signals includes, for each sensor electrode in the set of sensor electrodes, an excitation signal applied to the sensor electrode.

4. The capacitance sensing device of claim 1, wherein the TX generator is further configured to, for each TX signal pattern in the sequence of TX signal patterns:
apply the first excitation signal to contiguous sensor electrodes that are contiguous in a circular sequence of the set of sensor electrodes, wherein the contiguous sensor electrodes include at least half of the set of sensor electrodes.

5. The capacitance sensing device of claim 1, wherein:
the predetermined function is a sine function; and
the processing block is further configured to calculate the measure of correlation by calculating parameters for the sine function based on a least squares approximation of the sequence of RX signals.

6. The capacitance sensing device of claim 1, wherein each RX signal in the sequence of RX signals represents a self capacitance measured from the set of sensor electrodes.

7. The capacitance sensing device of claim 1, wherein:
the processing block is further configured to calculate a displacement based on a least squares approximation of the sequence of RX signals; and
the displacement indicates a position of the object relative to the set of sensor electrodes.

8. The capacitance sensing device of claim 1, wherein:
the measure of correlation comprises a correlation coefficient; and
the processing block is further configured to
compare the correlation coefficient with a predetermined threshold; and
detect the presence of the object when the correlation coefficient exceeds the predetermined threshold.

9. The capacitance sensing device of claim 1, further comprising:
an RX sensing channel coupled with the processing block and configured to, for each sensor electrode in the set of sensor electrodes, measure an RX signal of the sequence of RX signals after application to the sensor electrode of the one of the first excitation signal and the second excitation signal.

10. A method, comprising:
generating a sequence of RX signals by applying each TX signal pattern in a sequence of TX signal patterns to a set of sensor electrodes, the set of sensor electrodes comprising all of the sensor electrodes coupled to the transmit generator, wherein applying each TX signal pattern to the set of sensor electrodes comprises applying excitation signals to the set of sensor electrodes by, for each subset of a plurality of subsets each including three or more contiguous sensor electrodes of the set of sensor electrodes, applying the same one of a first excitation signal and a second excitation signal to each of the three or more contiguous sensor electrodes in the subset, wherein a magnitude of a sum of the excitation signals applied to the set of sensor electrodes is less than a magnitude of any one of the excitation signals applied to the set of sensor electrodes, and wherein the plurality of subsets comprises at least half of the sensor electrodes in the set of sensor electrodes;
for each TX signal pattern in the sequence of TX signal patterns, determining a next subsequent TX signal pattern in the sequence based on a circular rotation of the TX signal pattern; and
detecting a presence of an object proximate to the set of sensor electrodes based on a measure of correlation between the sequence of RX signals and a predetermined function.

11. The method of claim 10, wherein applying each TX signal pattern to the set of sensor electrodes further comprises, for each sensor electrode in the set of sensor electrodes, applying an excitation signal to the sensor electrode corresponding to an excitation signal applied to a preceding sensor electrode in a circular sequence of the set of sensor electrodes during application of a preceding TX signal pattern in the sequence of TX signal patterns, wherein the preceding TX signal pattern is a TX signal pattern most recently applied to the set of TX sensor electrodes prior to applying the TX signal pattern.

12. The method of claim 10, wherein
the second excitation signal is complementary to the first excitation signal; and
the excitation signals include the first excitation signal and the second excitation signal.

13. The method of claim 10, further comprising, for each TX signal pattern in the sequence of TX signal patterns:
applying the first excitation signal to contiguous sensor electrodes that are contiguous in a circular sequence of the set of sensor electrodes, wherein the contiguous sensor electrodes include at least half of the set of sensor electrodes.

14. The method of claim 10, further comprising:
calculating the measure of correlation by calculating parameters for the predetermined function based on a least squares approximation of the sequence of RX signals, wherein the predetermined function is a sine function.

15. The method of claim 10, wherein each RX signal in the sequence of RX signals represents a self capacitance measured from the set of sensor electrodes.

16. The method of claim 10, further comprising:
calculating a displacement based on a least squares approximation of the sequence of RX signals, wherein the displacement indicates a position of the object relative to the set of sensor electrodes.

17. The method of claim 10, further comprising:
comparing the measure of correlation with a predetermined threshold; and
detecting the presence of the object when the measure of correlation exceeds the predetermined threshold, wherein the measure of correlation comprises a correlation coefficient.

18. A capacitance sensing system, comprising:
a host device;
a capacitive sensor array comprising a set of sensor electrodes, the set of sensor electrodes comprising all of the sensor electrodes coupled to a TX generator;
wherein the TX generator is configured to generate a sequence of RX signals by applying each TX signal pattern in a sequence of TX signal patterns to the set of sensor electrodes, wherein for each TX signal pattern in the sequence of TX signal patterns, the TX generator is configured to apply excitation signals to the set of sensor electrodes by, for each subset of a plurality of subsets each including three or more contiguous sensor electrodes of the set of sensor electrodes, applying the same one of a first excitation signal and a second excitation signal to each of the three or more contiguous sensor electrodes in the subset, wherein a magnitude of a sum of the excitation signals applied to the set of sensor electrodes is less than a magnitude of any one of the excitation signals applied to the set of sensor electrodes, and wherein the plurality of subsets comprises at least half of the sensor electrodes in the set of sensor electrodes;

a sequencer circuit coupled with the TX generator and configured to, for each TX signal pattern in the sequence of TX signal patterns, determine a next subsequent TX signal pattern in the sequence based on a circular rotation of the TX signal pattern; and a processing block coupled with the host device and the TX generator and configured to detect a presence of an object proximate to the set of sensor electrodes based on a measure of correlation between the sequence of RX signals and a predetermined function.

19. The capacitance sensing system of claim 18, wherein:

the second excitation signal is complementary to the first excitation signal;

the excitation signals include the first excitation signal and the second excitation signal; and the processing block is further configured to:

calculate the measure of correlation by calculating parameters for the sine function based on a least squares approximation of the sequence of RX signals, and detect the presence of the object when the measure of correlation exceeds a predetermined threshold.

20. The capacitance sensing system of claim 18, wherein each RX signal in the sequence of RX signals represents a self capacitance measured from the set of sensor electrodes.

21. The capacitance sensing system of claim 18, further comprising a display coupled with the host device, wherein the capacitive sensor array overlies the display, and wherein the host device is configured to update the display in response to the detected presence of the object.

22. The capacitance sensing system of claim 18, wherein the processing block is further configured to detect a hover input by the object based on the sequence of RX signals, and wherein the host device is configured to execute a first subroutine in response to the hover input.

\* \* \* \* \*